United States Patent
Haidar et al.

(10) Patent No.: US 10,375,174 B2
(45) Date of Patent: Aug. 6, 2019

(54) CLOUD INTEGRATED VEHICLE PLATFORM

(71) Applicant: Vinli, Inc., Dallas, TX (US)

(72) Inventors: Mahmoud Haidar, Dallas, TX (US); Daniel Thomas Hall, Dallas, TX (US); Powell McVay Kinney, Coppell, TX (US); Kyle Justin Turney, Dallas, TX (US)

(73) Assignee: Vinli, Inc., Dallas, TX (US)

( * ) Notice: Subject to any disclaimer, the term of this patent is extended or adjusted under 35 U.S.C. 154(b) by 99 days.

(21) Appl. No.: 15/265,778

(22) Filed: Sep. 14, 2016

(65) Prior Publication Data

US 2017/0078398 A1   Mar. 16, 2017

Related U.S. Application Data

(60) Provisional application No. 62/218,501, filed on Sep. 14, 2015.

(51) Int. Cl.

| | | |
|---|---|---|
| G06F 15/16 | (2006.01) | |
| H04L 29/08 | (2006.01) | |
| G05B 15/02 | (2006.01) | |
| G07C 5/08 | (2006.01) | |
| H04L 29/06 | (2006.01) | |

(Continued)

(52) U.S. Cl.
CPC .......... *H04L 67/12* (2013.01); *G01C 21/3688* (2013.01); *G05B 15/02* (2013.01);
(Continued)

(58) Field of Classification Search
CPC ........ B60K 35/00; G01C 21/26; G05B 15/02; G07C 5/008; G07C 5/0816; H04L 67/10; H04L 67/12
See application file for complete search history.

(56) References Cited

U.S. PATENT DOCUMENTS

| 8,848,608 B1* | 9/2014 | Addepalli ............. H04W 4/046 370/328 |
|---|---|---|
| 9,123,186 B2* | 9/2015 | Ricci ....................... H04W 4/21 |

(Continued)

OTHER PUBLICATIONS

International Preliminary Report on Patentability (dated Mar. 29, 2018) (6 pages).

*Primary Examiner* — Yves Dalencourt
*Assistant Examiner* — Thorne E Waugh
(74) *Attorney, Agent, or Firm* — Kirby Drake

(57) ABSTRACT

A cloud integrated vehicle infotainment platform, method, and system are described. The system may include a cloud-integrated vehicle infotainment platform in communication with a vehicle information platform. The system may further include a graphical user interface configured to allow access to the cloud-integrated vehicle infotainment platform. The cloud-integrated vehicle infotainment platform may allow access to Internet of Things devices. The cloud-integrated vehicle infotainment platform may allow access to user data on a secure, password authenticated basis. The cloud-integrated vehicle infotainment platform may be integrated with an automotive infotainment head unit and the vehicle information platform. The systems and method may be for integrating a software development platform using legacy communication protocols into the display screens currently installed in vehicles or to be installed in the future. The platform may facilitate interface of applications developed on the platform by third parties with existing displays installed in vehicles or future displays.

18 Claims, 15 Drawing Sheets

(51) Int. Cl.
  *G01C 21/36* (2006.01)
  *G07C 5/00* (2006.01)
(52) U.S. Cl.
  CPC ............ *G07C 5/0816* (2013.01); *H04L 67/02* (2013.01); *H04L 67/04* (2013.01); *H04L 67/10* (2013.01); *H04L 67/125* (2013.01); *H04L 67/20* (2013.01); *H04L 67/42* (2013.01); *G07C 5/008* (2013.01)

(56) References Cited

U.S. PATENT DOCUMENTS

| | | | |
|---|---|---|---|
| 9,349,234 B2* | 5/2016 | Ricci | H04W 4/21 |
| 9,589,392 B2* | 3/2017 | Waller | B60K 37/06 |
| 9,973,535 B2* | 5/2018 | Maher | H04L 63/20 |
| 2013/0231784 A1 | 9/2013 | Rovik et al. | |
| 2014/0006555 A1* | 1/2014 | Shields | H04L 67/12 |
| | | | 709/217 |
| 2014/0109080 A1 | 4/2014 | Ricci | |
| 2014/0121891 A1 | 5/2014 | Barrett et al. | |
| 2014/0310788 A1* | 10/2014 | Ricci | B60Q 1/00 |
| | | | 726/6 |
| 2015/0178034 A1* | 6/2015 | Penilla | G06F 3/04842 |
| | | | 345/1.1 |
| 2015/0188961 A1* | 7/2015 | Ricci | H04L 63/10 |
| | | | 709/219 |
| 2017/0075366 A1* | 3/2017 | Esselink | G05B 15/02 |
| 2017/0337752 A1* | 11/2017 | Holdren | G06F 9/453 |

* cited by examiner

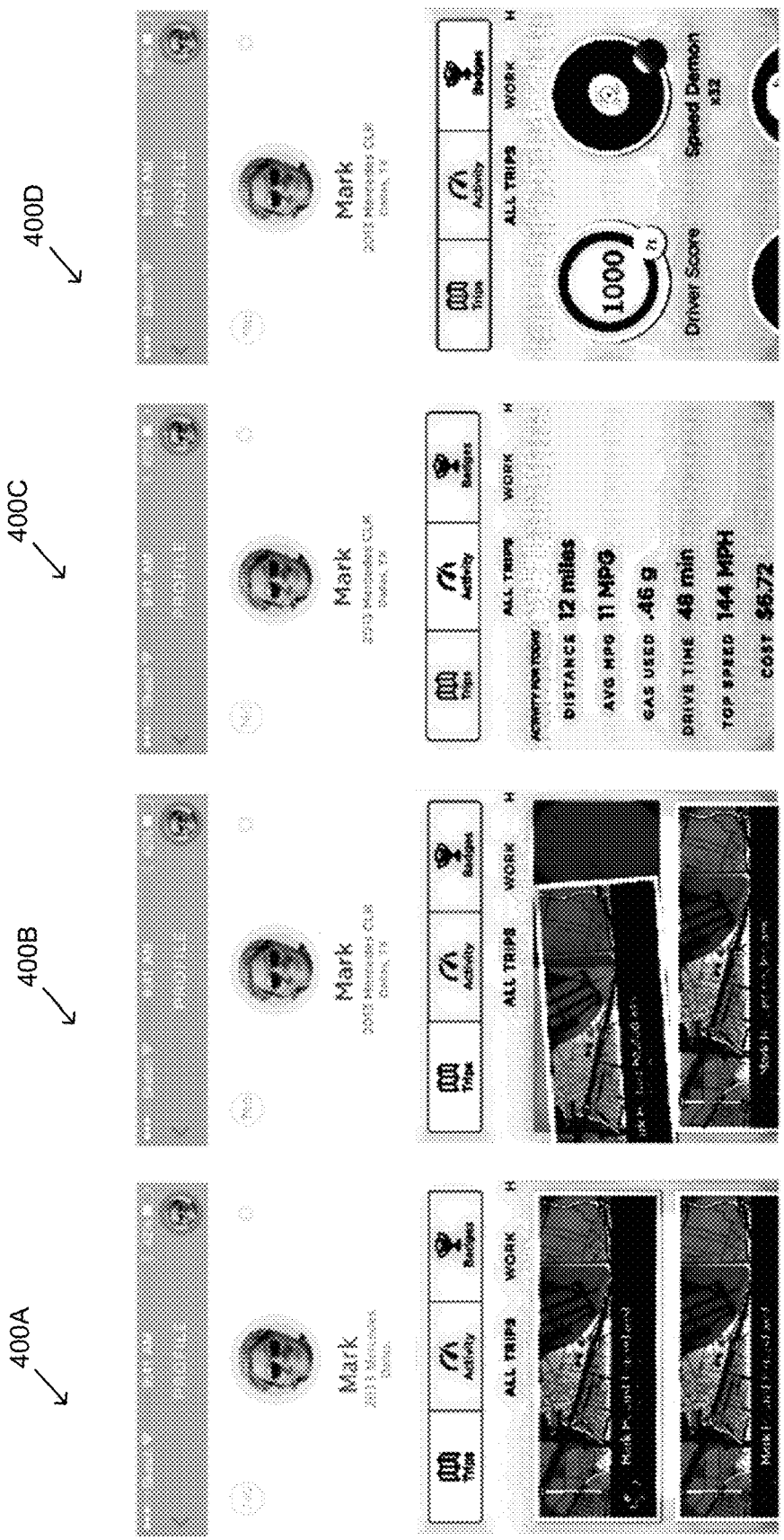

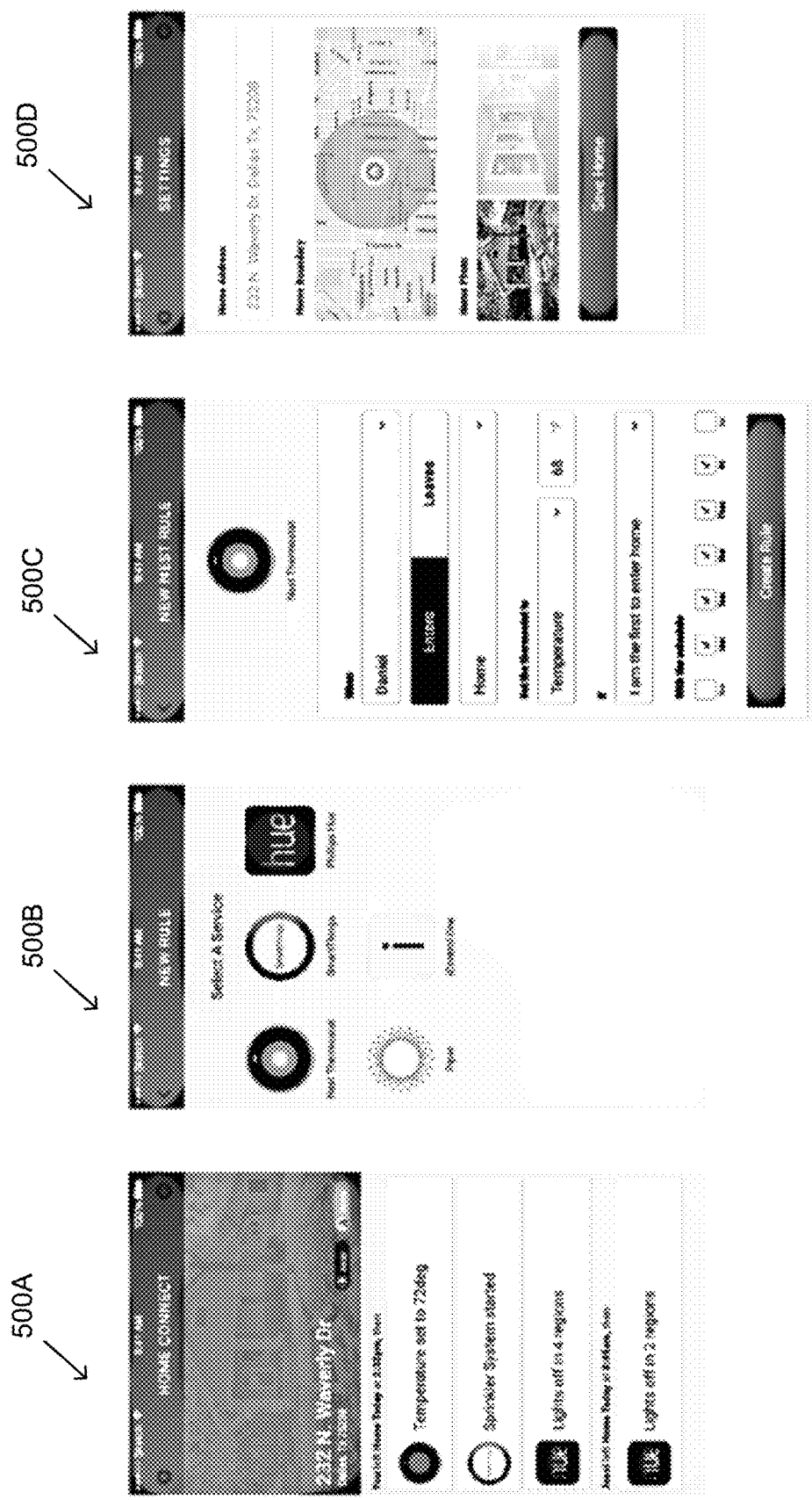

CLOUD INTEGRATED VEHICLE PLATFORM

CROSS-REFERENCE TO RELATED APPLICATIONS

This application claims priority to and the benefit of U.S. Provisional Patent Application No. 62/218,501 filed on Sep. 14, 2015, the disclosure of which is herein incorporated by reference in its entirety.

TECHNICAL FIELD

The technical field may generally relate to vehicle information, infotainment and related data management, user applications, and display in a vehicle.

BACKGROUND

Globally, billions of intelligent, Internet-enabled devices combine to trillions of connections which are integrated throughout the fabric of modern society. Modern cars can generate gigabytes of data per mile and most drivers spend upwards of 10% of the time they are awake each day in them. This yields tremendous amounts of valuable data, transforming our world in many, diverse ways.

This data, when combined with tremendous advances in cloud computing analytical capabilities and exposed via standard application programing interfaces, empowers the global mobile developer community to create innovative, new, car data powered experiences. Thus, there may be a need to enable in-vehicle and vehicle based experiences which integrate innovative Internet of Things ("IoT") (i.e., internet-enabled devices) experiences for drivers.

Further, in the U.S., cellphone use may cause over 1 in 4 car accidents. Drivers should be focused on the road, and not on their phones. As such, there may be a need for a vehicle infotainment platform that connects a dashboard display or head unit with a smartphone or a vehicle information platform.

SUMMARY

In an embodiment, a system may include a cloud-integrated vehicle infotainment platform in communication with a vehicle information platform. The system may further include a graphical user interface configured to allow access to the cloud-integrated vehicle infotainment platform. The cloud-integrated vehicle infotainment platform may allow access to IoT devices such as network appliances, remote controllable electronic devices, and other devices as described herein. The cloud-integrated vehicle infotainment platform may allow access to user data on a secure, password authenticated basis. The cloud-integrated vehicle infotainment platform may be based on HTML5 technology, connected cloud services and high-speed integrated vehicle connectivity.

The systems, methods and devices suitable for use with or otherwise implementing features disclosed herein may be a one or more computing devices. A computing device or computer may include a server computer, a client user computer, a personal computer (PC), a laptop computer, a tablet PC, an electronic dongle, an electronic vehicle system, a processor, a desktop computer, a control system, a microprocessor, other computers or electronic devices described herein, or any computing device capable of executing a set of instructions (sequential or otherwise) that specify actions to be taken by that computing device. Computing devices can exchange data such as vehicle data, user data and mobile device data, appliance data, IoT device data, and other data disclosed herein using a network which can include one or more wired, optical, wireless or other data exchange connections One or more of the following features may be included. The cloud-integrated vehicle infotainment platform may be integrated with an automotive infotainment head unit and the vehicle information platform. In one embodiment, the head unit includes or is in electronic communication with a display, which may include a touch screen display. The head unit can include a dashboard implemented using a display to depict the vehicle related information and user interfaces described herein. The information displayed can be transmitted from an application designed to interface with one or both of a cloud-integrated vehicle infotainment platform and a vehicle information platform. In one embodiment, rather than a head unit or dashboard, the display of information in or about a vehicle is provided by a user interface of a mobile device in communication with one or more systems described herein.

The cloud-integrated vehicle infotainment platform may provide access to one or more of driving patterns, vehicle health, trip specific scenarios, connections, people, fleet management functionality, and external devices. The cloud-integrated vehicle infotainment platform allows access to intelligent home devices including one or more of smart vents, smart thermostats, smart security, smart lighting systems, distributed audio, smart pet devices, and awareness of these devices. The cloud-integrated vehicle infotainment platform may be configured to control one or more intelligent home devices including at least one of smart vents, smart thermostats, smart security, smart lighting systems, distributed audio, smart pet devices, and awareness of these devices. The cloud-integrated vehicle infotainment platform displays one or more vehicle information platform application-based user interfaces via an automotive infotainment head unit.

Additionally, one or more of the following features may be included. The cloud-integrated vehicle infotainment platform may be configured to define vehicle-related rules which trigger adjustment to one or more intelligent home devices. The cloud-integrated vehicle infotainment platform may be configured to define vehicle-rules which trigger alerts based on vehicle behavior. The cloud-integrated vehicle infotainment platform may be configured to collect vehicle trip data, including speed, number of fuel stops, and fuel cost data are captured and perform operations on the vehicle trip data including comparing vehicle trip data and sharing operation results.

In one embodiment, the cloud-integrated vehicle infotainment platform may be configured to access maintenance milestones and predictive diagnostics in response to triggered vehicle alert, decipher DTC codes, and present related information in real-time. The cloud-integrated vehicle infotainment platform may be configured to display vehicle information platform applications via an automotive infotainment head unit, switch between applications, and display application-specific information overlaid on top of a map showing other user devices. The cloud-integrated vehicle infotainment platform is configured to collect current state information from a URL and receive events and status information from one or more vehicle information platform applications.

In an embodiment, a method may include integrating a vehicle infotainment platform with a vehicle information platform. The method may further include displaying vehicle information platform application graphical user interfaces at an automotive infotainment head unit via the vehicle infotainment platform. The method may also include providing an application programming interface for the vehicle infotainment platform. The method may additionally include authenticating one or more client electronic devices or home intelligent devices with the vehicle infotainment platform. Moreover, the method may include providing access to one or more vehicle information platform applications at the automotive infotainment head unit via the vehicle infotainment platform.

In part, the disclosure relates to a system of one or more computers configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system including: a cloud-integrated vehicle infotainment platform in communication with a vehicle information platform, and a graphical user interface configured to allow access to the cloud-integrated vehicle infotainment platform. Other embodiments of this aspect include corresponding computer systems, apparatus, and computer programs recorded on one or more computer storage devices, each configured to perform the actions of the methods.

Implementations may include one or more of the following features. The system where the cloud-integrated vehicle infotainment platform allows access to internet of things devices. The system where the cloud-integrated vehicle infotainment platform allows access to user data on a secure, password authenticated basis or other forms of authentication such as biometrics, multifactor authentication, etc. The system where the cloud-integrated vehicle infotainment platform is based on html5 technology, connected cloud services and high speed integrated vehicle connectivity. The system where the cloud-integrated vehicle infotainment platform is integrated with an automotive infotainment head unit and the vehicle information platform. The system where the cloud-integrated vehicle infotainment platform provides access to one or more of driving patterns, vehicle health, trip specific scenarios, connections, people, and external devices.

In addition, implementations may include one or more of the following features. The system where the cloud-integrated vehicle infotainment platform allows access to intelligent home devices including one or more of smart vents, smart thermostats, smart security, smart lighting systems, distributed audio, smart pet devices, and awareness of these devices. The system where the cloud-integrated vehicle infotainment platform is configured to control one or more intelligent home devices including at least one of smart vents, smart thermostats, smart security, smart lighting systems, distributed audio, smart pet devices, and awareness of these devices. The system where the cloud-integrated vehicle infotainment platform displays one or more vehicle information platform application-based user interfaces via an automotive infotainment head unit. The system where the cloud-integrated vehicle infotainment platform is configured to define vehicle-related rules that trigger adjustment to one or more intelligent home devices. The system where the cloud-integrated vehicle infotainment platform is configured to define vehicle-rules that trigger alerts based on vehicle behavior. The system where the cloud-integrated vehicle infotainment platform is configured to collect vehicle trip data, including speed, number of fuel stops, and fuel cost data are captured and perform operations on the vehicle trip data including comparing vehicle trip data and sharing operation results.

In various embodiments, the disclosure relates to a system where the cloud-integrated vehicle infotainment platform is configured to access maintenance milestones and predictive diagnostics in response to triggered vehicle alert, decipher DTC codes, and present related information in real-time. The system where the cloud-integrated vehicle infotainment platform is configured to display vehicle information platform applications via an automotive infotainment head unit, switch between applications, and display application-specific information overlaid on top of a map showing user devices. The system where the cloud-integrated vehicle infotainment platform is configured to collect current state information from a URL and receive events and status information from one or more vehicle information platform applications. Implementations of the described techniques may include hardware, a method or process, or computer software on a computer-accessible medium.

One general aspect includes a method including: integrating a vehicle infotainment platform with a vehicle information platform, displaying vehicle information platform application graphical user interfaces at an automotive infotainment head unit via the vehicle infotainment platform, providing an application programming interface for the vehicle infotainment platform, authenticating one or more client electronic devices or home intelligent devices with the vehicle infotainment platform, and providing access to one or more vehicle information platform applications at the automotive infotainment head unit via the vehicle infotainment platform. Other embodiments of this aspect include corresponding computer systems, apparatus, and computer programs recorded on one or more computer storage devices, each configured to perform the actions of the methods.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of controlling vehicle information exchange between one or more computing devices including: integrating a vehicle infotainment platform with a vehicle information platform, displaying vehicle information platform application graphical user interfaces at a computing device disposed within a vehicle via the vehicle infotainment platform, providing an application programming interface for the vehicle infotainment platform, authenticating one or more client electronic devices or home intelligent devices with the vehicle infotainment platform, and providing access to one or more vehicle information platform applications at the computing device disposed within the vehicle via the vehicle infotainment platform. Other embodiments of this aspect include corresponding computer systems, apparatus, and computer programs recorded on one or more computer storage devices, each configured to perform the actions of the methods.

Implementations may include one or more of the following features. The method where the computing device disposed within the vehicle is an automotive infotainment head unit. The method where the automotive infotainment head unit includes a display, one or more processors, and one or more buses, where the buses are in electronic communication with the processor and vehicle infotainment (IVI) memory of the vehicle. The method where the application programming interface (API) of the vehicle infotainment platform is responsive to API requests from an active vehicle information platform applications displayed on the automotive infotainment head unit, the API provide content and inputs to the active application. The method where the API is responsive to instructions transmitted from one or more third party computing devices to provide one or more types of content to the automotive infotainment head unit. The method further includes filtering developer provided configuration information for each application such that information displayed to automotive infotainment head unit is constrained to reduce end user distraction.

In one embodiment, the method where the computing device disposed within the vehicle includes a mobile electronic device, the method further includes providing access to one or more vehicle information platform applications via the mobile device. The method further includes populating the application with content selected in response to information received by the vehicle infotainment platform from a device connected to an OBD port of the vehicle. The method further includes providing a rules services as part of the vehicle infotainment platform, where one or more rules are subscribed to by one or more applications of the vehicle infotainment platform, where one or more of the rules include a device identifier; one or more boundary constraints for the device; and a state. The method further includes controlling what information is displayed and how it is displayed from an application of the vehicle infotainment platform in response to one or more rules, where the rules are based on at least one of a vehicle situation, a location, a time and a user setting. The method further includes, in response to vehicle telemetry data, displaying a first category of information to a user from an application when the vehicle is in motion and displaying a second category of information to the user when the vehicle has stopped.

In one embodiment, the method further includes accessing one or more of maintenance milestones and predictive diagnostics in response to triggered vehicle alert, decipher DTC codes and presenting related vehicle maintenance information in real-time based on the accessed information. The method where a data collection software application configured to communicate with the vehicle infotainment platform is installed in or in communication with vehicle infotainment memory and further includes outputting, to a user, information generated in response to data collected from the data collection software application. Implementations of the described techniques may include hardware, a method or process, or computer software on a computer-accessible medium.

The details of one or more implementations are set forth in the accompanying drawings and the description below. Other features and advantages will become apparent from the description, the drawings, and the claims.

BRIEF DESCRIPTION OF THE DRAWINGS

FIGS. 8A-8D are schematic diagrams of application user interfaces and application outputs for use with a vehicle head unit, computing device, or dashboard display that relate to a driving or navigation application of a vehicle infotainment platform in accordance with the present disclosure.

FIGS. 9A-9D are schematic diagrams of application user interfaces and application outputs for use with a vehicle head unit, computing device, or dashboard display for controlling the home or another building using a rules-based application of a vehicle infotainment platform in accordance with the present disclosure.

DETAILED DESCRIPTION

Overview

Connected vehicle solutions, such as automotive solutions, may be used in a platform designed to help auto manufacturers realize the potential of integrating the car into the growing Internet of Things (IoT) space. Intelligent systems add value to systems and help provide a mechanism for the growth and new technology. Thus, there may be a need to enable innovative software, cloud & IoT device-based experiences inside and outside the car. An Open Infotainment Platform (OIP) or vehicle infotainment platform may enable a wide range of HTML5 based third party solutions that allow drivers to seamlessly integrate across their digital lives. In one embodiment, the vehicle infotainment platform may be referred to as Carport, as a non-limiting example of such a platform. Other suitable branding or identifiers can be used to refer to a given vehicle infotainment platform without limitation. The term "vehicle infotainment platform" or platform or system, can be used synonymously with Carport without limitation as used herein.

For example, a vehicle infotainment platform may bring applications and services from a vehicle information platform to a vehicle's built-in display, creating a safer connected driver experience. The vehicle infotainment platform may feature an intuitive, location based user interface and may connect drivers to various aspects of their digital life, including their car, home and loved ones.

Figure 1:
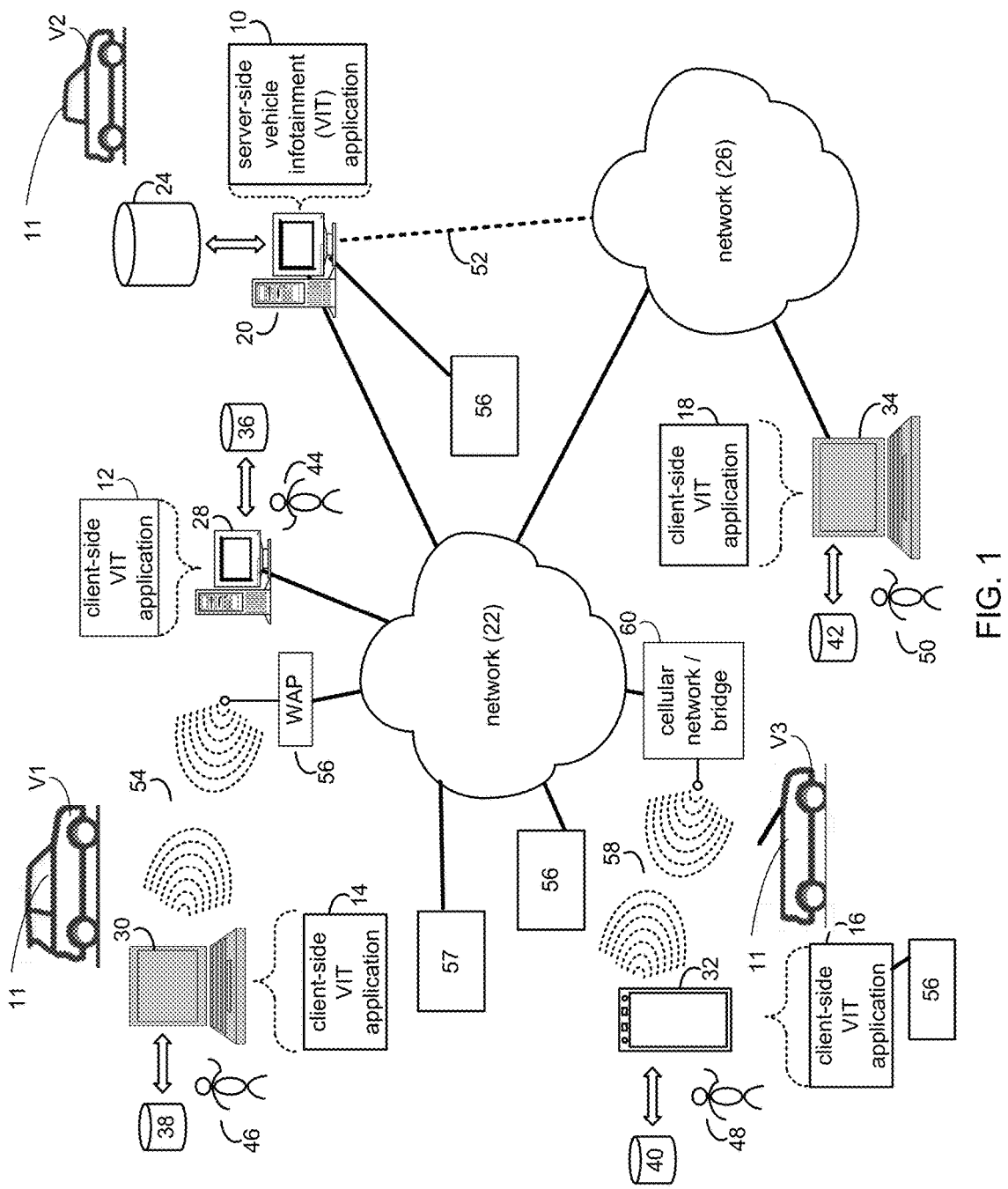
FIG. 1 is an overview of a system that can execute one or more vehicle infotainment processes and exchange vehicle related data with one or more vehicles and computing devices such as mobile devices, head units, and dashboards disposed in or connected to such devices in accordance with the present disclosure.

Referring to FIG. 1, there is shown a server-side vehicle infotainment (VIT) application 10 and client-side VIT applications 12, 14, 16, and 18. Server application 10 and/or one or more of client applications 12, 14, 16, and/or 18 may execute one or more processes configured to carry out one or more of the features described herein. Server application 10 may be referred to as a process configured to carry out one or more of the features described herein, such as vehicle infotainment process 10. Further, one or more of client applications 12, 14, 16, and 18 may be referred to as a process configured to carry out one or more of the features described herein, such as vehicle infotainment processes 12, 14, 16, and/or 18.

The vehicle infotainment process 10 may be a server-side process (e.g., server-side vehicle infotainment process 10), a client-side process (e.g., client-side vehicle infotainment process 12, client-side vehicle infotainment process 14, client-side vehicle infotainment process 16, or client-side vehicle infotainment process 18), or a hybrid server-side/client-side process (e.g., a combination of server-side vehicle infotainment process 10 and one or more of client-side vehicle infotainment processes 12, 14, 16, 18). This application relates to the U.S. patent application Ser. No. 14/848,316 filed on Sep. 8, 2015 and entitled "Vehicle Information System", the disclosure of which is herein incorporated by reference in its entirety.

Vehicle Infotainment Platform Overview

Referring to FIG. 1, server-side vehicle infotainment process 10 may reside on and may be executed by server computer 20, which may run the vehicle infotainment platform and which may be in communication with network 22 (e.g., the Internet or a local area network). Examples of server computer 20 may include, but are not limited to: a personal computer, a server computer, a series of server computers, a mini computer, and/or a mainframe computer. The server computer 20 may be a distributed system and the operations of server computer 20 may execute on one or more processors, simultaneously and/or serially.

For example, server computer 20 may be a symbolic representation of a cloud computing site, cloud environment, or cloud platform running multiple servers, computers, or virtual machines (e.g., a virtual machine host computer). Server computer 20 may execute one or more operating systems, examples of which may include but are not limited to: Microsoft Windows Server™; Novell Netware™; Redhat Linux™, Unix, or a custom operating system, for example.

The instruction sets and subroutines of server-side vehicle infotainment process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a solid state storage device; a RAID array; a random access memory (RAM); and a read-only memory (ROM).

Server computer 20 may execute a web server application that allows for access to server computer 20 (via network 22) using one or more protocols, examples of which may include but are not limited to HTTP (i.e., HyperText Transfer Protocol). Network 22 may be in communication with one or more secondary networks (e.g., network 26), examples of which may include but are not limited to: a local area network; a wide area network; or an intranet, for example.

Client-side vehicle infotainment processes 12, 14, 16, 18 may reside on and may be executed by client electronic devices 28, 30, 32, and/or 34 (respectively), examples of which may include but are not limited to personal computer 28, a television with one or more processors embedded therein or coupled thereto (not shown), laptop computer 30, data-enabled mobile telephone 32, notebook computer 34, a tablet (not shown), and a personal digital assistant (not shown), a vehicle dashboard or head unit, for example. Client electronic devices 28, 30, 32, and/or 34 may each be in communication with network 22 and/or network 26 and may each execute an operating system, examples of which may include but are not limited to Apple iOS™, Microsoft Windows™, Android™, Redhat Linux™, or a custom operating system.

The instruction sets and subroutines of client-side vehicle infotainment processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; solid state storage devices; RAID arrays; random access memories (RAM); read-only memories (ROM); compact flash (CF) storage devices; secure digital (SD) storage devices; and memory stick storage devices.

Client-side vehicle infotainment processes 12, 14, 16, 18 and/or server-side vehicle infotainment process 10 may be processes that run within (i.e., are part of) a cloud computing site, cloud computing application, cloud platform, or cloud environment. Alternatively, client-side vehicle infotainment processes 12, 14, 16, 18 and/or server-side vehicle infotainment process 10 may be stand-alone applications that work in conjunction with the cloud computing site, cloud computing application, cloud platform, or cloud environment. One or more of client-side vehicle infotainment processes 12, 14, 16, 18 and server-side vehicle infotainment process 10 may interface with each other (via network 22 and/or network 26).

In one embodiment, one or more of the client-side processes run within each of the exemplary vehicles V1, V2, V3 shown in FIG. 1. The process may access one or more memory systems or buses of each vehicle. Vehicles V1, V2, and V3, may be the vehicles of a fleet such as taxis or freight haulers. In another embodiment, the vehicles V1, V2, and V3, may be the vehicles of a family, such as spouses and their child. In another embodiment, the vehicles V1, V2, and V3, may be the vehicles of a household of roommates or emergency responders. In one embodiment, a given vehicle V1, V2, and V3 is a car, truck or other type of electric, mechanical, or combustion engine-based vehicle suitable for travel on land, air, or water.

Users 44, 46, 48, 50 may access server-side vehicle infotainment process 10 directly through the device on which the client-side vehicle infotainment process (e.g., client-side vehicle infotainment processes 12, 14, 16, 18) is executed, namely client electronic devices 28, 30, 32, 34, for example or a dashboard, mobile device, or other computing device used in or connected to one or more of vehicles V1, V2, and V3. Users 44, 46, 48, 50 may access server-side vehicle infotainment process 10 directly through network 22 and/or through secondary network 26. Further, server computer 20 (i.e., the computer that executes server-side vehicle infotainment process 10) may be in communication with network 22 through secondary network 26, as illustrated with phantom link line 52.

In one embodiment, each vehicle V1, V2, and V3 can represent an electronic computing device 11 in or connected to a vehicle. In one embodiment, each vehicle V1, V2, and V3 can include a dongle, mobile device, mobile phone, plug, IoT device, dashboard, or other device (generally referred to as a computing device 11) which connects to a port or communication channel in each respective, vehicle. In one embodiment, each vehicle V1, V2, V3 includes one or more buses and communication channels in electrical communication with one or more computing devices, such as a processor or application specific integrated circuit, and one or more memory devices. In one embodiment, the one or more memory devices include the vehicle infotainment (IVI) memory or components and subsystems thereof In one embodiment, each of the foregoing components is part of device 11 or another vehicle system. In one embodiment, the device 11 is an on board data collection device as described in U.S. patent application Ser. No. 14/848,316 filed on Sep. 8, 2015 and entitled "Vehicle Information System."

In one embodiment, the device 11 can be implemented as a dongle, connector, plug or other device that can collect data from a vehicle. In one embodiment, the device 11 attaches to the on board diagnostic output port of a vehicle and communicate data about the car to a server, a communication device in the car, a mobile device, or other devices and collect and relay information about the vehicle, third party information relevant to the use of the vehicle, the drivers and passengers of the vehicle, historic events relating to the vehicle, travel paths and navigation and GPS information, and other information of interest to supply a data feed to one or more software applications that transform and use such data. The software applications can be created by developers and in turn run on the VIT and collected data from the vehicle information system or device 11. The software applications can transform data from the vehicle and generate various signals and outputs in response thereto to provide navigation, security, tracking, home control, repair, entertainment, personalization and other services.

In one embodiment, software programs, instructions, APIs, or other software modules from the provider of vehicle infotainment platform or vehicle information platform is installed or in communication with a car or other vehicle's in vehicle infotainment (IVI) memory. One or more such software modules may communicate with the vehicle infotainment platform such as through a computing device (dashboard or phone, for example), using 3G/LTE, WAN, Bluetooth, or other networking or communication channels as described herein. In another embodiment, the vehicle infotainment platform communicates with the IVI memory over the air. As a result, the content, processed data, and other information from a given API or software application (such as for example the applications shown in FIGS. 2B, 2C, and 2D, for example) and as described and depicted herein), is effectively streamed to a user/consumer interacting with one or more of the systems and platforms described herein.

The various client electronic devices 11 and others shown in FIG. 1 may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22.

WAP 56 may be, for example, an IEEE 802.11a, 802.11b, 802.11g, 802.11n, Wi-Fi, and/or Bluetooth device that is capable of establishing a wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22. In addition, one or more rules engine(s) 57 can be connected via a network or otherwise be part of one or more of the client side VIT applications 12, 14, 16 and/or the server side VIT application 10. The rules engines or other components of the platform can provide a rule service which informs the operation and outputs of developer applications.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK)

modulation, for example. Bluetooth is a telecommunications industry specification that allows e.g., mobile phones, computers, and personal digital assistants to be interconnected using a short-range wireless connection.

In one embodiment, the application programming interface may be used by a $3^{rd}$ party server to insert or otherwise add additional content into the infotainment system. The infotainment system uses internal logic and rules to determine what information from a $3^{rd}$ party system should be displayed and how it is displayed based on vehicle situation, location, time, or user settings. Additional details relating to an exemplary rules service and rules processing are described in more detail herein.

In one embodiment, the vehicle infotainment platform server or another server or computing device maintains developer provided configurations information. That configuration information specifies how that developer's content is displayed in the infotainment display. The platform applies this configuration on textual and other data provided to the vehicle infotainment platform by the developer's application. By having the platform apply the configuration, it is possible to restrict a developer's capability to render distracting or overwhelming information to the infotainment display. In this way, the platform filters information displayed in the vehicle to improve safety.

The vehicle infotainment application can use local or server-based vehicle telemetry data to determine how and when to display information to a user. For instance, notifications sent by multiple $3^{rd}$ party applications can be queued by the infotainment display while the vehicle is moving and only shown to the driver when the vehicle has come to a stop. Similarly certain information may be displayed based on triggers and rules that depend on real-time vehicle information. For instance, when stopped, the infotainment display can notify a user that their fuel economy was improved in the preceding section of the trip or that they exceeded the speed limit 2 times so far this trip. Geofences and other boundary constraints can be used to define rules which when triggered result in events or data that changes application output on the platform.

Vehicle Infotainment Processes and/or Applications

For the following discussion, server-side vehicle infotainment process 10 will be described for illustrative purposes and server computer 20 may run server-side vehicle infotainment application 10 to carry out some or all of the techniques and features described here. It should be noted that server-side vehicle infotainment process 10 may interact with client-side vehicle infotainment process 12 and may be executed within one or more applications that allow for communication with client-side vehicle infotainment process 12. However, this is not intended to be a limitation of this disclosure, as other configurations are possible (e.g., stand-alone, client-side vehicle infotainment processes and/or stand-alone server-side vehicle infotainment processes). For example, some implementations may include one or more of client-side vehicle infotainment processes 12, 14, 16, and 18 in place of or in addition to server-side vehicle infotainment process 10. Vehicle infotainment process 10 and/or vehicle infotainment application 10 may represent one or more applications that may run with the infotainment platform described here.

Figure 2A:
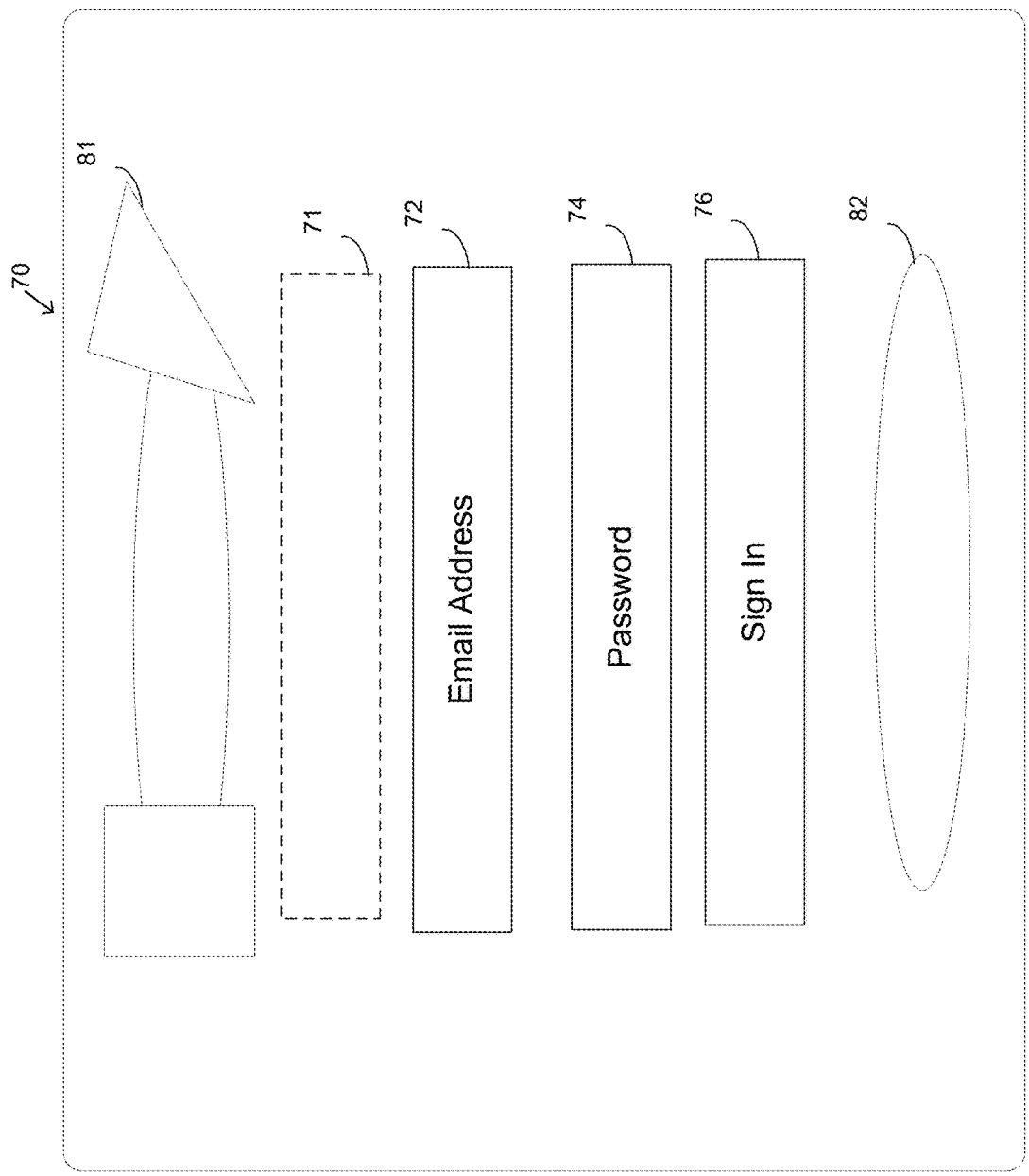
FIG. 2A is a graphical user interface suitable for gaining access to a vehicle infotainment platform that is operating on one or more computing devices in accordance with the present disclosure.

The vehicle infotainment platform may bring and video information platform applications and services directly to a vehicle's built-in display or head unit and may create a safer connected driver experience. A location based user interface may connect drivers to aspects of their digital life, including their car, home and loved ones. Once launched, the vehicle infotainment platform may feature various services. Referring to FIG. 2A, there is shown an example login screen 70 of the vehicle infotainment platform through which the platform may be launched. The login screen 70 includes, for example, instructions 71, a text box 72 for entering an email address or other user identification information, a text box 74 for entering a password, and a button 76 for signing into the platform. Various logos or other branding 81, 82 can be included as part of the login screen/entrance portal 70 for the vehicle infotainment platform.

Figure 2B:
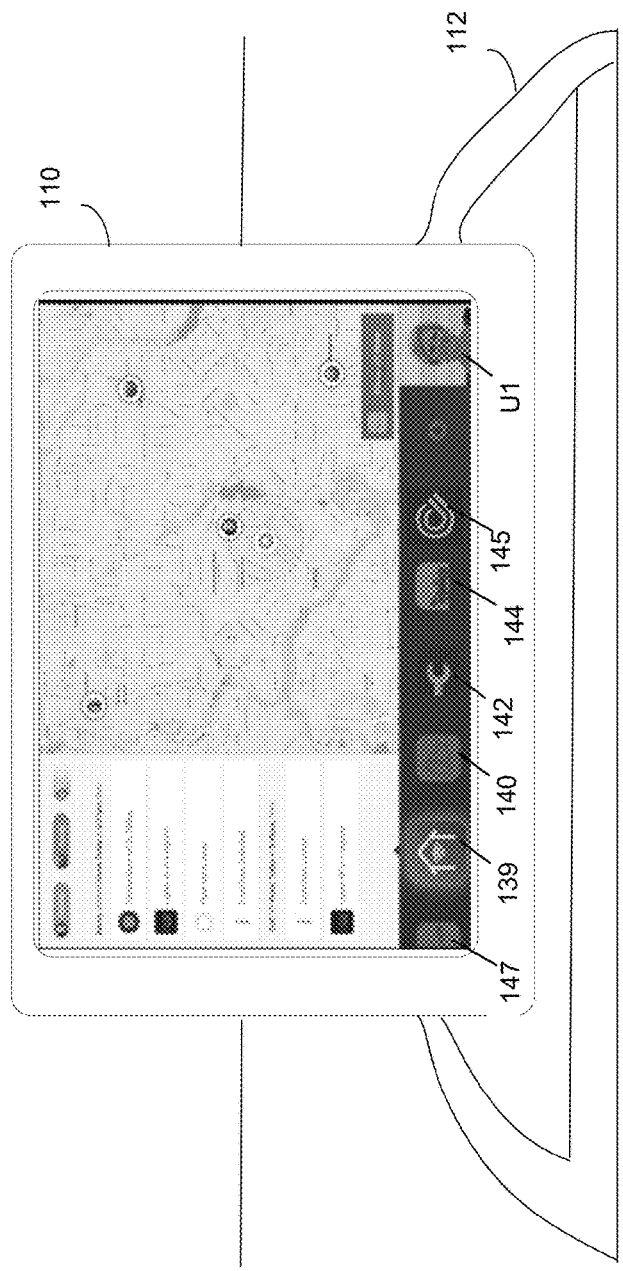
FIG. 2B is schematic diagram of vehicle head unit or dashboard display suitable for use with a vehicle infotainment platform, an exemplary vehicle infotainment platform application and various actionable user interface on-screen elements for selecting among such applications and providing inputs in accordance with the present disclosure.

The vehicle infotainment platform can run various applications using vehicle specific data from an on board device or a mobile phone in a vehicle. As shown in FIG. 2B, the applications can run on various computing devices such as mobile phone or a head unit or dashboard console 110 disposed within a car or other vehicle. This device can include a mount 112 or be retractable. The head unit/dashboard 110 includes a display which can include touch screen. The dashboard 110 can be a computing device and allows a user to activate and scroll through various applications of the vehicle infotainment platform. Various applications can be selected.

Figure 2C:
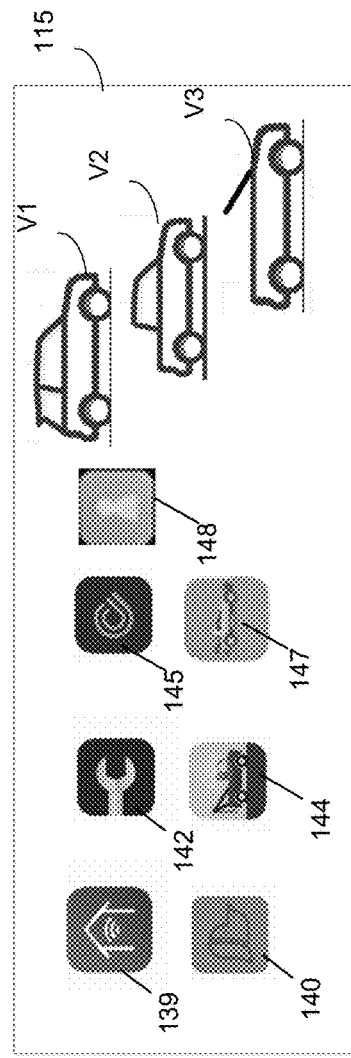
FIG. 2C is schematic diagram of user interface with graphical interface elements that can initiate execution of various vehicle infotainment platform applications and provide vehicle information relative to three different vehicles in accordance with the present disclosure.
Figure 2D:
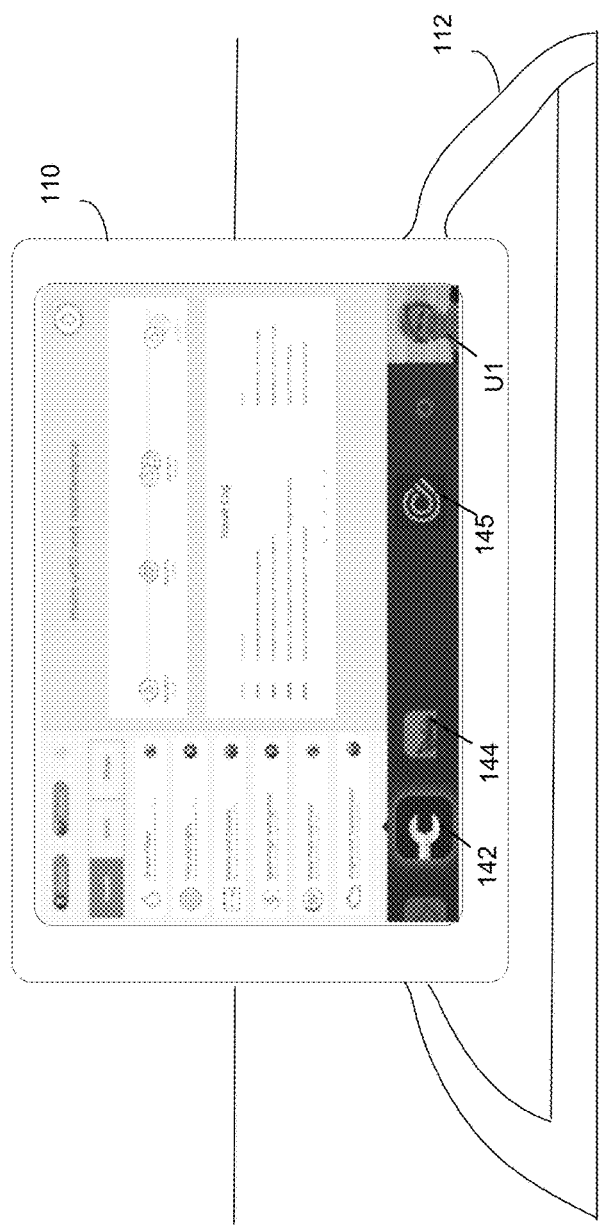
FIG. 2D is schematic diagram of vehicle head unit or dashboard display suitable for use with a vehicle infotainment platform, an exemplary vehicle infotainment platform application and various actionable user interface on screen elements for selecting among such applications and providing inputs n accordance with the present disclosure.

For example, a home connect application 139 may allow a driver to view a real-time map of their loved ones and personalized smart home settings that trigger lighting, temperature, security and more. As shown in FIG. 2C, a user interface 115 of the vehicle infotainment platform such as displayed on a dashboard, a head unit, a phone, or another computing device showing various applications 139 (Home), 140 ("Beagle"-real time monitoring of connected vehicles V1, V2,V3), 142 (Vehicle Repair/Maintenance), 144 (Roadside Assistance), 145 (Carport/general vehicle infotainment platform access and control), 147 (Drive—navigation and driving information), and 148 (Vehicle Security). These icons or on screen element can initiate operation of the underlying platform application. The user interface 115 also shows three cars V1, V2, and V3 which are connected to the vehicle infotainment platform such as by a dongle or plug in device for the OBD port for each respective vehicle. These various applications and others described herein are designed for use on a vehicle infotainment platform such as a cloud-based dashboard system.

Figure 2E:
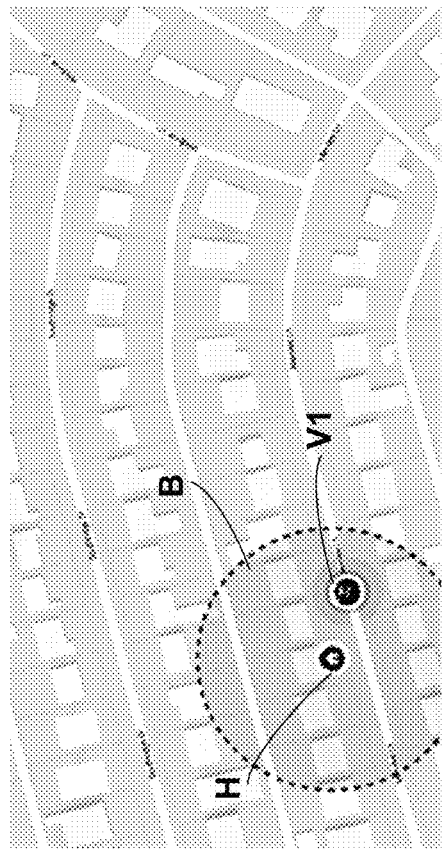
FIG. 2E is schematic diagram of user interface showing location changes of vehicle for which the vehicle infotainment platform has information such as from an on board data collection device in the vehicle.

FIG. 2E is schematic diagram of user interface showing location changes of vehicle V1 for which the vehicle infotainment platform has information such as from an on board data collection device in the vehicle. The interface of FIG. 2E is a real time display and as V1 moves it is shown. As the vehicle V1 moves, it can react to boundaries such as boundary B centered on home H. A user can monitor V1 with Beagle 140 or the driver can use the display to configure the home application 139.

Figure 3:
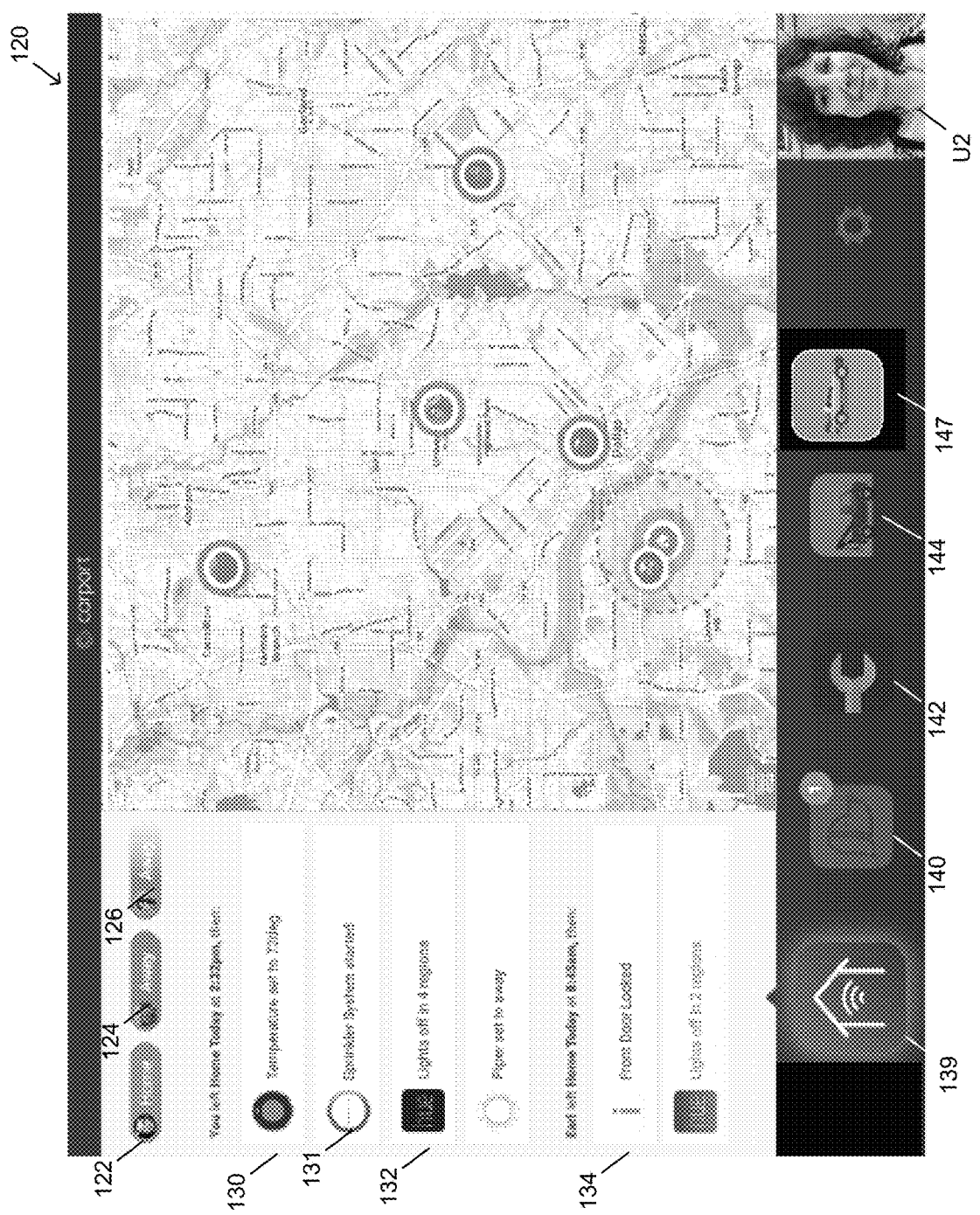
FIG. 3 is schematic diagram of vehicle head unit or dashboard display suitable for use with a vehicle infotainment platform executing an exemplary vehicle infotainment platform application for controlling the home, other building or facility in accordance with the present disclosure.
Figure 4A:
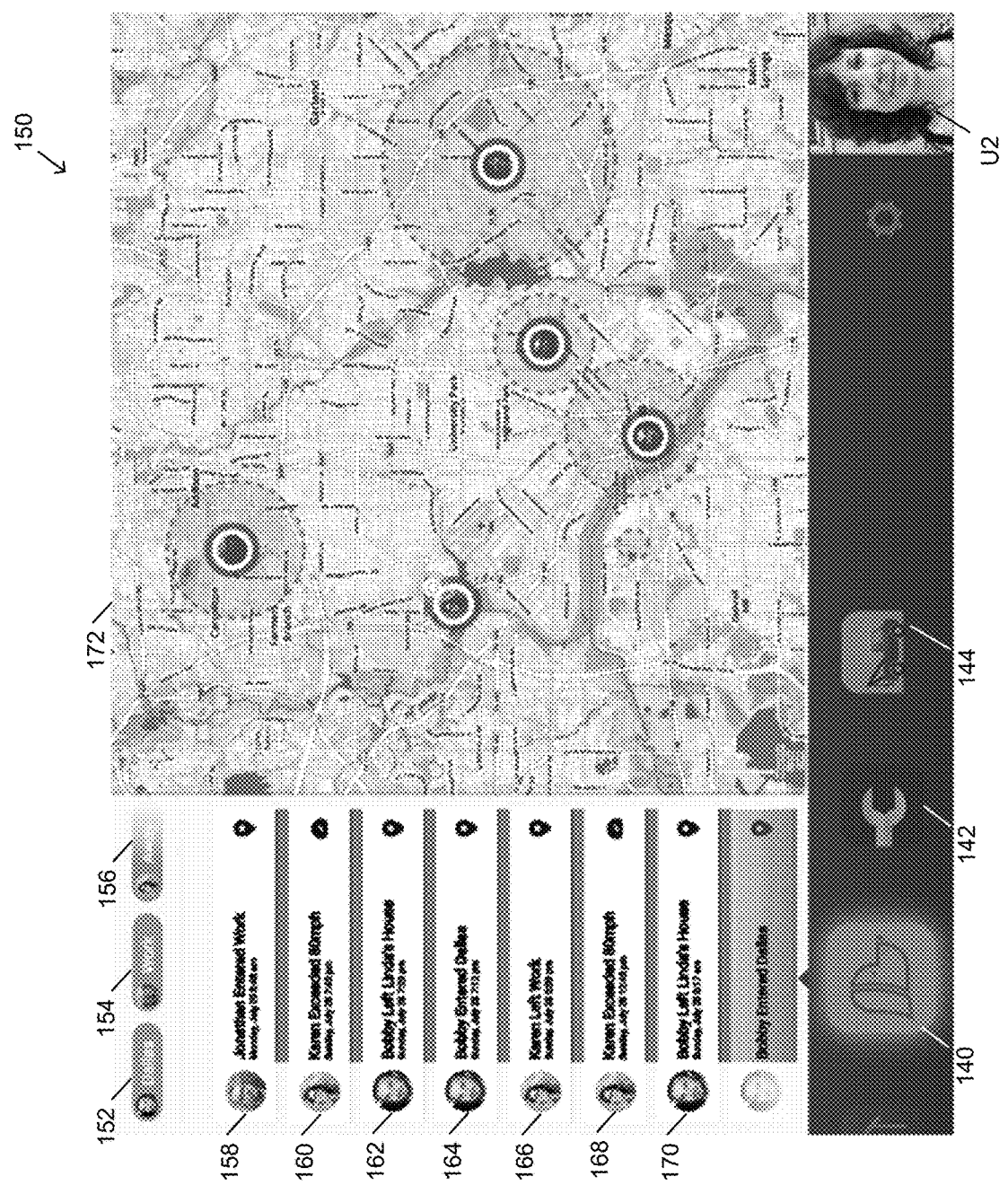
FIG. 4A is schematic diagram of vehicle head unit or dashboard display suitable for use with a vehicle infotainment platform executing an exemplary vehicle infotainment platform application for monitoring vehicles in accordance with the present disclosure.

Referring to FIGS. 3 and 4A, there is shown example graphical user interfaces 120, 150 showing various features of the vehicle infotainment platform and software applications designed for use on the platform, as described herein. In FIG. 3, interface 120 shows the Home application 139 as selected. This application has various uses. For example, as the last person pulls out of the driveway, the vehicle infotainment platform, which may be referred to as Carport or other suitable branding or identifier, the driver can select a home settings application 139 to show the driver the state of various conditions without and around the home. This Home application 139 can also be used to control various devices in and around the home. User U2 is also shown Additionally, in the user interface 120 shown in FIG. 3, the Home application 139 of the vehicle infotainment platform has been selected and is executing. A user U2 has logged in and is using the Home application 139. The display of application information and user interface component from the application 139 shows the user that the thermostat is set to a temperature in a thermostat icon 130. Two members of the household are "away" as shown in top left panel. in The application 139 also shows user U2 that the sprinkler system of the home has started as shown by sprinkler icon 131, that the lights are turned off in a lighting icon 132, and that the front door is locked in a front door icon 134.

Figure 4B:
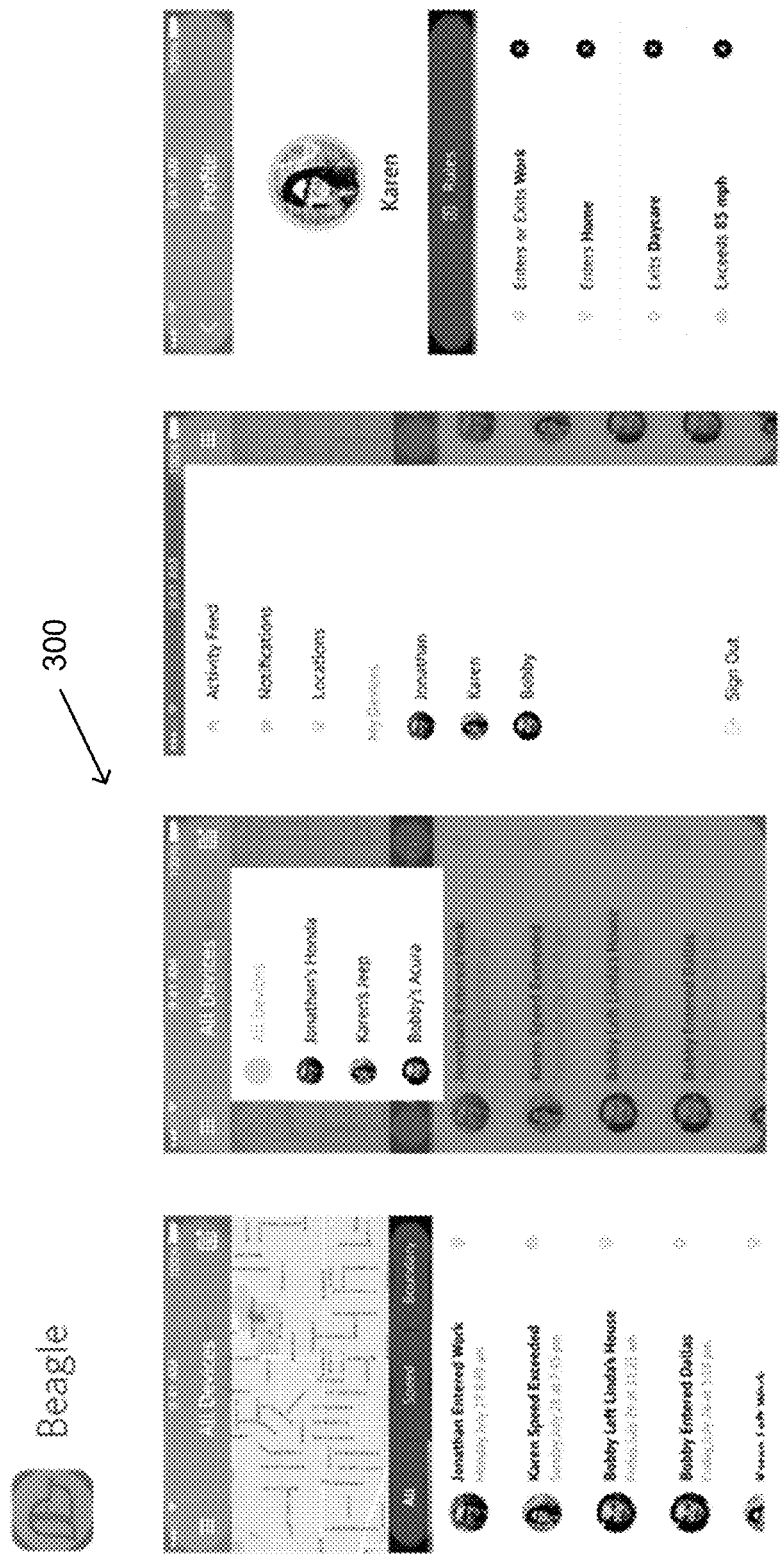
FIG. 4B is schematic diagram showing additional graphical user interface screens on a computing device that relate to the vehicle infotainment platform application of FIG. 4A in accordance with the present disclosure.

The user U2 can set these various home conditions by selecting a smart home setting using icons personalized either by user, whether or not the user is home or away, or both. For example, the user interface 120 includes an icon 122 for when a first user is home, an icon 124 for when a second user is away, and an icon 126 for when a third user is away. Thus, each user can select the state of the conditions of the when they arrive home or leave the home. Further, drivers can monitor the whereabouts of their family as they lead their mobile lives. By simply selecting the Beagle icon 140 in vehicle infotainment platform, (Carport, for example) the driver can quickly and easily monitor the real-time location of each vehicle information application connected car in their household as shown in the graphical user interface 150 of FIG. 4A. The application is referred to as Beagle but any suitable identifier or branding can be used. FIG. 4B provides additional user interface screens (generally 300) for the real-time monitoring of another vehicle, such as V1, V2, or V3 (or all of them).

In one embodiment, the user interface 150 displays the current location of each member of the household. For example, icons 152, 154, 156 shown the driver the current location of each household member. The user interface 150 also include a timeline of the locations of each member of the household as they move between the home, work, and other locations on the left panel, including information about their travel, such as the speed of the car as they move between locations.

Examples of this information are shown in the timeline icons 158, 160, 162, 164, 166, 168, 170. A map 172 can also be included that gives the driver a visual representation of the location of each household member. Also, drivers can access a personalized timeline of maintenance milestones using a maintenance icon 142 and predictive diagnostics using a diagnostics icon 144 for their car when the engine triggers an alert, vehicle infotainment platform/Carport will present this to the user in real-time. The system will then decipher the code and provide the driver with more detail on the alert.

By controlling and filtering application information before it is displayed, the vehicle infotainment platform/Carport focuses on awareness and education without inundating the driver with distracting notifications. The state of the vehicle, whether it is stopped, accelerating, slowing down, wherein it is, the time of day and other factors can be used to display different categories of content at different times. One category of content may be more alarm and as such is suitable for when the user pulls into their driveway at home. Other content, such as an audio weather report, may be an acceptable category to deliver while driving. FIG. 4B shows information about each driver in the first interface screen and speed and boundary information to constrain rules. All of the devices are shown in the second panel. The third panel provide activity feeds, notifications and locations for three devices with three users. These devices can be OBD devices in one embodiment.

Figure 5:
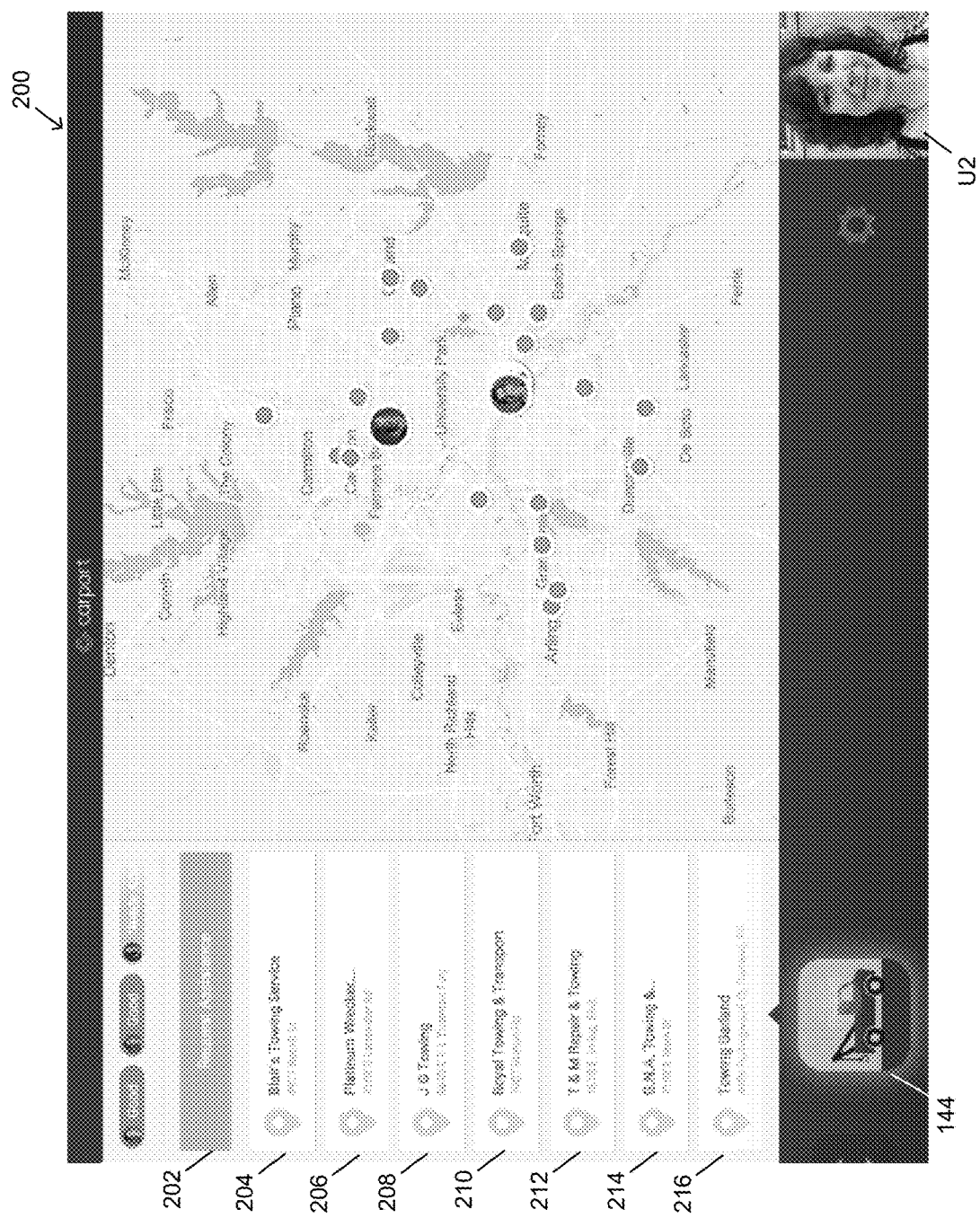
FIG. 5 is schematic diagram of vehicle head unit or dashboard display suitable for use with a vehicle infotainment platform executing an exemplary vehicle infotainment platform for application for roadside assistance in accordance with the present disclosure.

Referring now to FIG. 5, there is shown an example graphical user interface 200 showing various features of the vehicle infotainment platform, including a feature that allows for requesting assistance. The driver selects the diagnostics icon 144, which displays the user interface 200 regarding options for when an alert is triggered or the driver needs assistance. Drivers can summon services using the assistance icon 202. Activating the assistance icon 202 presents options to the driver including tire services, fuel delivery services, and towing companies using a plurality of icons 204, 206, 208, 210, 212, 214, 216. Each icon 204, 206, 208, 210, 212, 214, 216 represented an available service option, and includes information regarding the precise location and availability of each of the service providers at the press of a button.

Figure 6A:
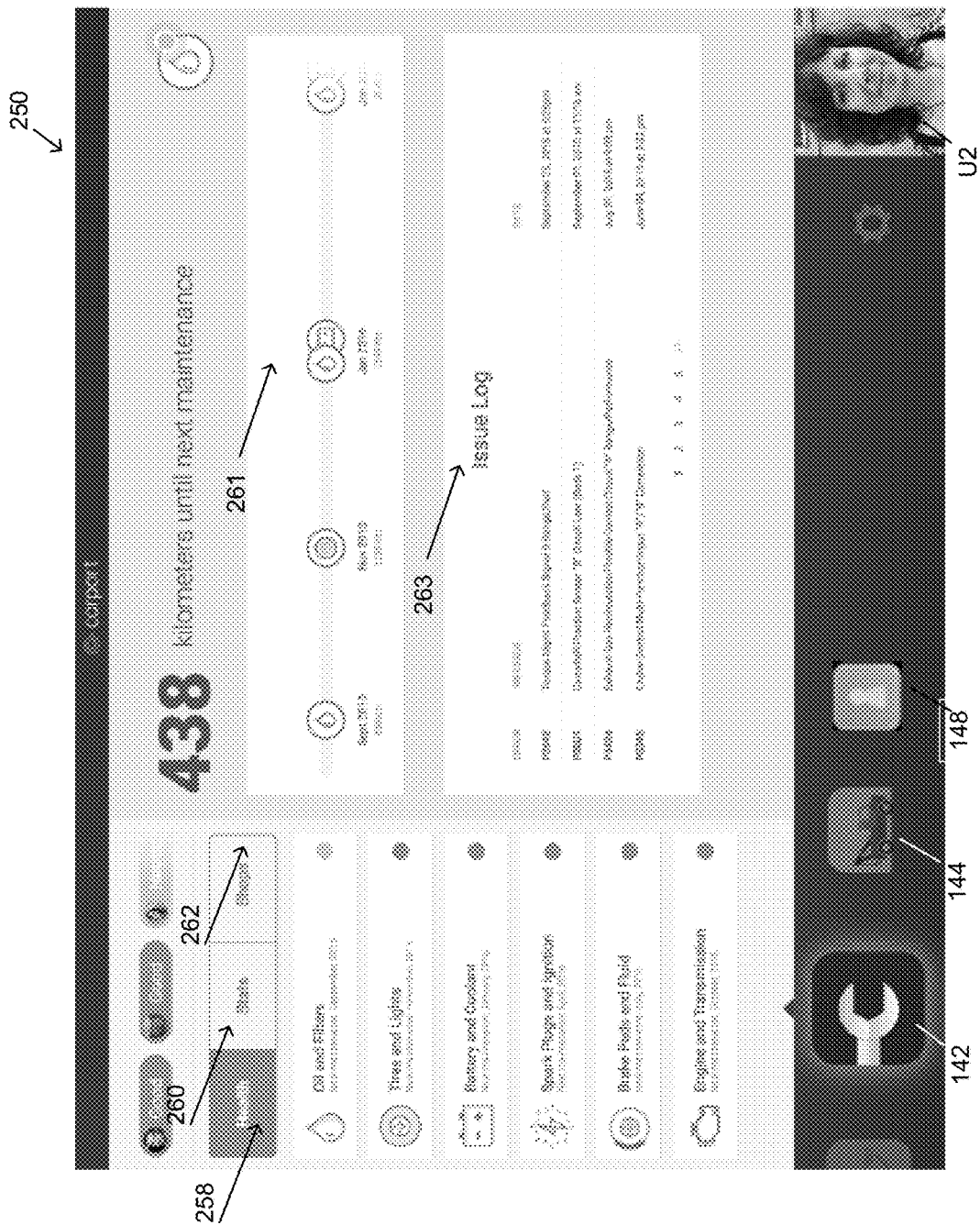
FIG. 6A is schematic diagram of vehicle head unit or dashboard display suitable for use with a vehicle infotainment platform executing an exemplary vehicle infotainment platform application for providing timelines and information for repair and maintenance tasks for the vehicle in accordance with the present disclosure.

Referring now to FIG. 6A, there is shown an example graphical user interface 250 showing various features of the vehicle infotainment platform, including a feature that allows for viewing various diagnostic vehicle information. The driver selects the maintenance icon 142 which displays the user interface 250 and maintenance milestones and information associated with the vehicle. The top panel in the middle section shows a timeline of maintenance task for a given vehicle with a given device 11. An issue log is shown below the timeline interface.

Figure 6B:
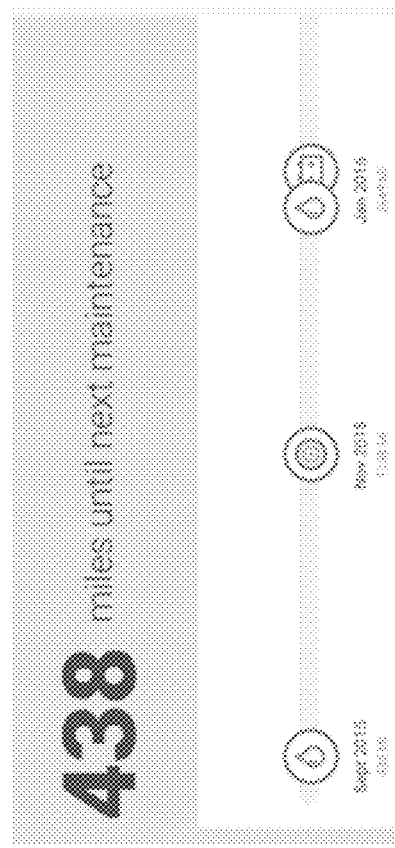
FIGS. 6B and 6C are schematic diagrams showing additional graphical user interface screens on a computing device that relate to the vehicle infotainment platform application of FIG. 6A and the countdown to maintenance feature of the application in accordance with the present disclosure.
Figure 6C:
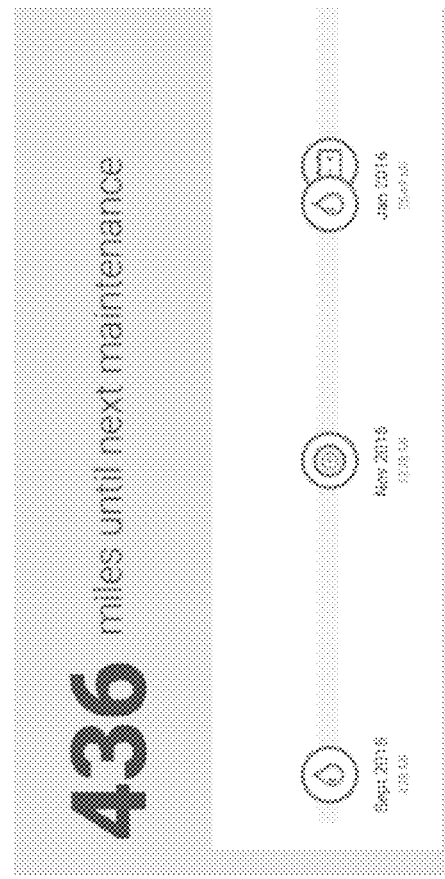
Figure 6D:
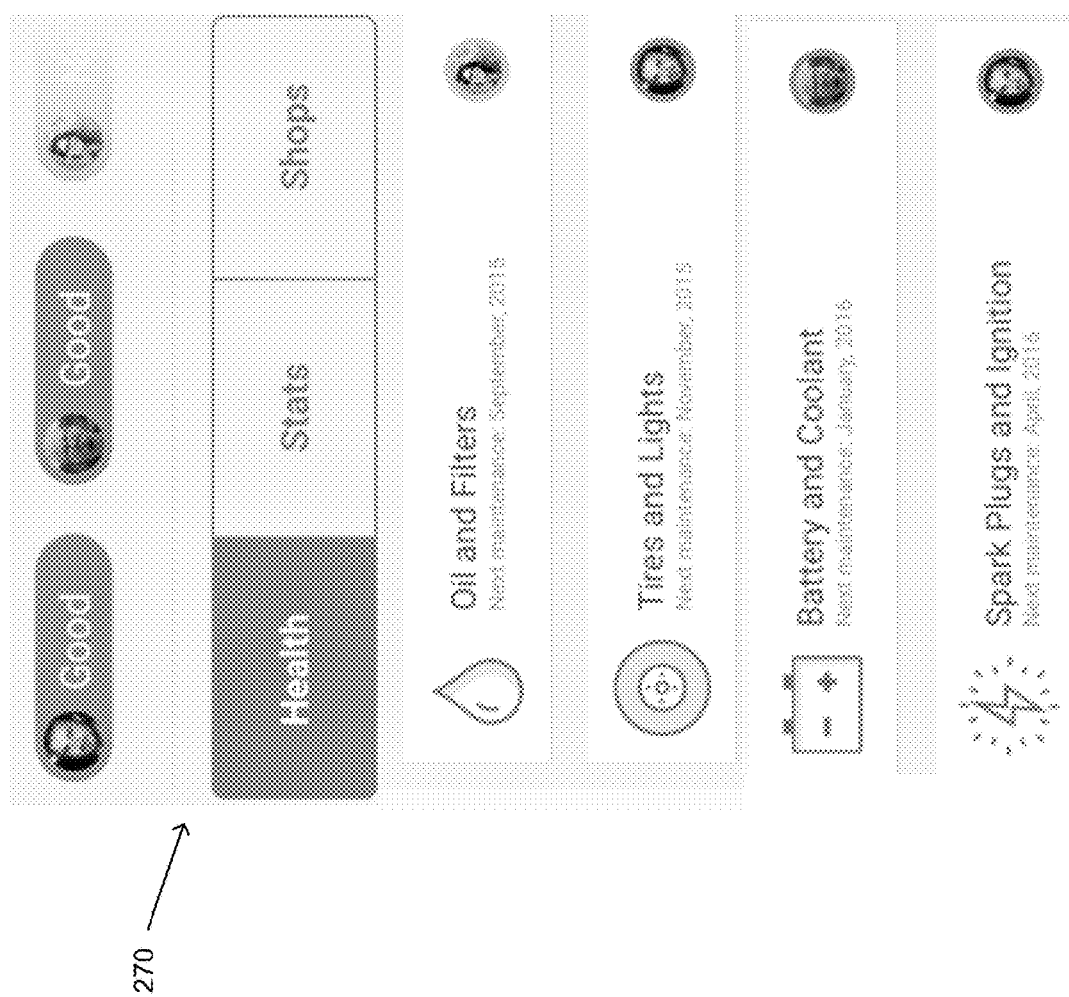
FIG. 6D is schematic diagram showing additional graphical user interface screens on a computing device that relate to the vehicle infotainment platform application of FIG. 6A that show maintenance and repair items for various users of vehicles connected to one or more vehicle platforms in accordance with the present disclosure.

For example, with a given vehicle infotainment platform contextual, personalized information may be brought to drivers without distracting them from the road. The user interface 250 includes information about the overall state of each vehicle associated with the household using icons relating to each vehicle. The distance of 438 kilometers until next maintenance will count down as distances are traversed as shown in FIGS. 6A and 6B where 438 in interface 255 has decremented to 436 as shown in interface 265. In this way, users are reminded. For each vehicle, the driver can view the health, maintenance statistics, or services using the health icon 258, stats icon 260, or shops icon 262. For example, in the exemplary user interface 250, the health icon 258 has been selected, which displays various icons relating to the health of a plurality of components of the vehicle, including but not limited to the oil and filters, the tires and lights, the battery and coolant, the spark plugs and ignition, the brake pads and fluid, and the engine and transmission with icons shown. Various information relating the past maintenance and maintenance timelines can also be displayed to the driver. For example, a timeline 261 is displayed that shows the user dates of past maintenance. An issue log 263 includes a list of past maintenance issues with their associated dates.

A vehicle infotainment platform may integrate with automotive OEM's that support open systems based HTML5 infotainment platforms. The vehicle infotainment platform may integrate with automaker's existing designs. A vehicle infotainment platform is technology designed for direct vehicle integration. Further, a vehicle infotainment platform may be based on, but is not limited to, industry standard HTML5 technology, connected cloud services and high speed integrated vehicle connectivity. This architecture supports easy integration into existing and future automotive infotainment head units.

In one embodiment, a vehicle infotainment platform such as Carport may be a standard offering that may be customized per automotive OEM's request. The vehicle infotainment platform may be directly integrated with automotive OEM vehicles by the well known, existing Tier 1 supply chain. There may be no additional products required for OEM's to deliver vehicle infotainment platform capabilities in their vehicles. Carport may be directly integrated within the car. There may be no additional products required for OEM's to deliver Carport capabilities in their vehicles. Carport experience is based on vehicle information platform data which is generated by vehicle data, smartphone applications and cloud to cloud integration. For example, an application may display dynamic vehicle alerts of your teen driver. That alert is defined and managed using the vehicle information platform smartphone application on iOS or Android.

Figure 7:
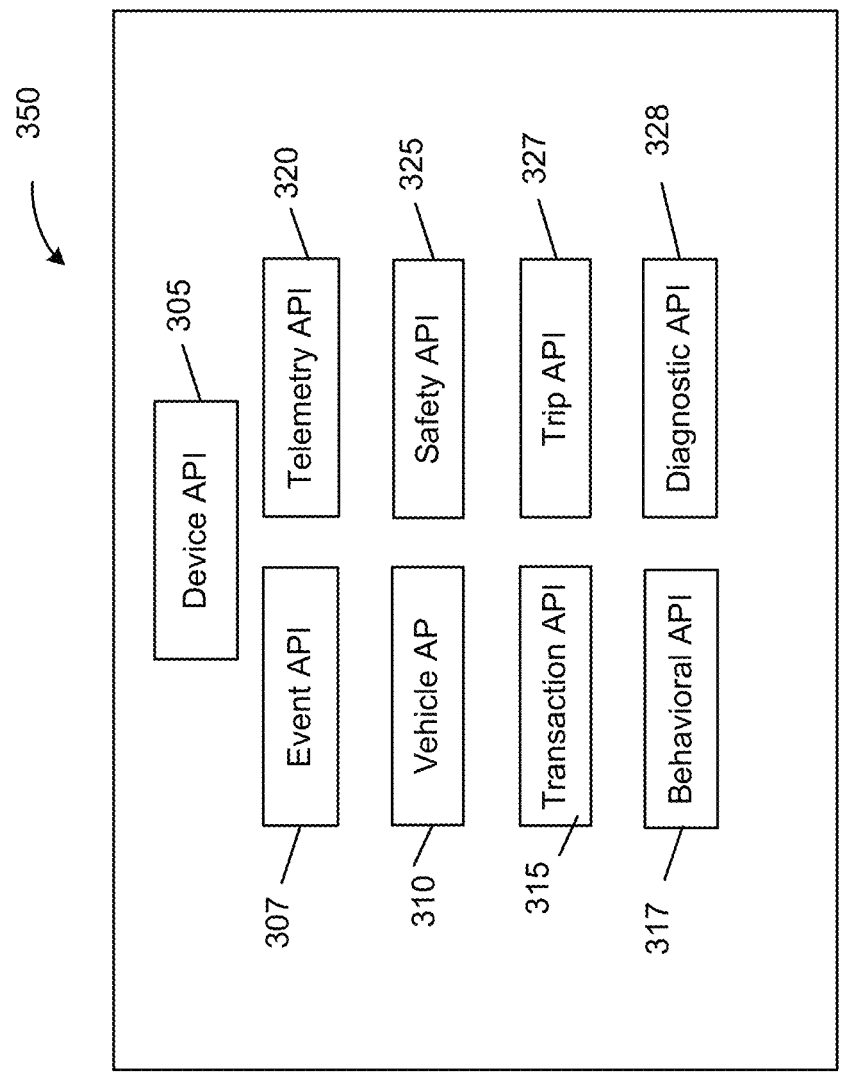
FIG. 7 is schematic diagram of an exemplary set of application programming interfaces created to exchange data and provide responsive feedback and inputs for vehicle infotainment platform applications

Carport may be based on vehicle information platform APIs and may enable rich experiences based on vehicle specific and relevant data. Driving patterns, vehicle health and trip specific scenarios are viewable in Carport at a glance. Carport may enable drivers with visibility to the connections, people and devices outside of the car. Carport's focus is enhancing the experience for the driver, while allowing the car to seamlessly connect and communicate with the world around them. A collection of API's 350 suitable for use with a vehicle platform are shown in FIG. 7. These API's can include without limitation Device API 305; Transaction API 315; Vehicle AP 310; Event API 307; Telemetry API 320; Trip API 327; Diagnostic API 328; Safety API 325; and Behavioral API 328. These API's can be used to develop application for use on the platform that request data or other information with an API and receive from the platform or device 11, third party content providers or other data repositories. Additional exemplary details for implementing such API's are provided in Appendix A as non-limiting examples of suitable APIs.

Automakers may integrate multi-function display technology in new cars. The vehicle infotainment platform is designed with that in mind, allowing drivers to be aware, not only of their vehicle, but also the broad spectrum of connected IoT devices and related experiences that matter most in their lives. In an embodiment, a vehicle infotainment platform may function with an OBD interface device used with the vehicle information platform.

As the lives of drivers become more and more connected, IoT devices and experiences will continue to grow. A smart refrigerator may create a smart shopping list reconciled against the connected organic market's fresh produce that was just put on sale that happens to be on a route of travel. Carport may connect the driver to their digital life of today and the future.

Carport may use the vehicle information platform's security best practices through Active protection, Firmware Protection and Authentication. Carport may be a cloud-based dashboard, making it a secure point connected car infrastructure. Active protection may allow for potential hacking or sending of malicious code to be blocked on the hardware level so that unauthorized data cannot be sent to the engine. A hardware infrastructure may block outside access to an engine data through Carport. Firmware Protection of an OBD interface device will not allow non approved or malicious code to be sent to the engine. This may be accomplished through a vehicle information platform encryption that is unreadable by unauthorized parties.

Unauthorized persons may not access or communicate through Carport and only those devices authenticated may gain access. Username and password are required to access the Carport system, followed by phone messaging to validate that this is rightful access. Carport does not store any data on its own besides some configuration and vehicle-specific settings. The Carport system and 3rd-party applications may rely primarily on the data within the vehicle information platform. In one embodiment, this information comes from the vehicles IVI memory or through an on board device such as a dongle or plug that connects to an OBD port.

Application developers can easily integrate their applications with the vehicle platform described herein and create new applications for the connected car. For example, developers can add Carport capabilities to their current vehicle information platform applications by enabling the application in the developer portal. Applications that are integrated with Carport adhere to the same security standards as vehicle information platform applications. The Carport API is implemented and deployed to the vehicle information platform in one embodiment. User interface element 145 can provide access to various Carport systems and functionalities.

In an embodiment, a car may be equipped with an open infotainment platform (OIP) or vehicle infotainment platform integrated device that may be an OBD interface device. Cloud enabled capabilities may be provided which allow seamless integration of a digital lifestyle outside of the car, to the increasing time spent inside of the car. Carport is an integrated, cloud connected car platform. Access to a user's data, is extended on a secure, password authenticated basis.

In general, access to user data is authorized after the requestor is authenticated using a suitable authentication method. Various mechanisms and technology can be used to provide such authentication, for example biometric, multi-factor authentication, key fobs with access tokens, and other methods can be used in some embodiments. The authentication process may be a 1-time process and an element of a security and privacy scheme designed to protect access to users personal cloud data.

The ability to integrate drivers with their vast personal IoT cloud may be critical for the 21st century digital lifestyle. Homes of today feature an enormous variety of "intelligent things" ranging from smart vents, to smart thermostats, to smart security, smart lighting systems, distributed audio, and even smart pet solutions. A car including cloud connected OIP may provide the ability for a driver to be aware of the state of these devices comes at a glance. A driver may "check-in" on her home in the car. For example, via the OIP or vehicle infotainment platform described herein, a driver may see from the display on his dashboard that his thermostat has lowered the temperature, the garden sprinkler system is on, lights have been appropriately reduced and an alarm system is active in "away" mode.

Drivers may have very mobile families and teenagers who drive under certain restrictions. Cloud connected car technology from the vehicle information platform may feature an application which allows families the ability to define vehicle operational conditions, like speed alerts and geo-fences with advance alerting, giving peace of mind to busy parents of teen drivers. Through the OIP display on the car dashboard, a driver may see her husband on his daily commute, one of her children's car in the school parking lot (where it should be), and her oldest child, still at home.

Smartphones may be central to our digital lives. We use them from the time we wake, to the time we go to sleep. The vehicle information platform connected car solution integrates into the digital lives of drivers when they are outside of the car. Available are a range of applications, as well as a growing catalogue of smartphone solutions for both of the popular mobile OS environments, iOS and Android. For example, a smartphone application may extend in-car capabilities to include defining the specific geo-fences that make sense for a new teen driver. For example, referring now to FIG. 4B, a smartphone application graphical user interface 300 in accordance with the present disclosure is shown, and may be used to enable related family type features. Perhaps, boundary definitions like school, work and the popular hang-out spots help a parent to encourage responsible driving. These boundaries can be implemented using the rules services, state and boundary rules as described herein. Users can also define speed restrictions like "do not drive over 65 MPH".

Figures 10A, 10B, 10C, 10D:
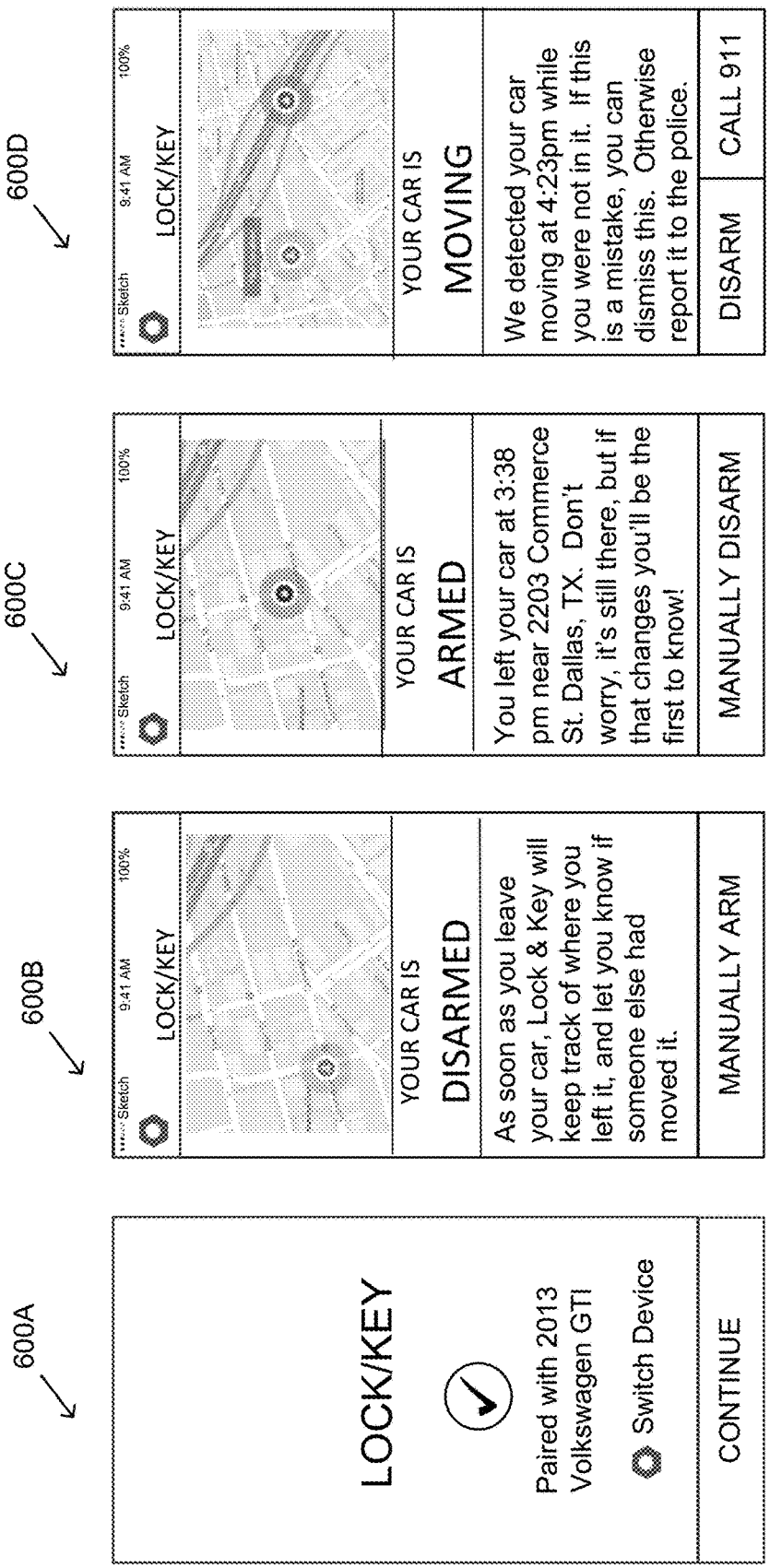
FIGS. 10A-10D are schematic diagrams of application user interfaces and application outputs for use with a vehicle head unit, computing device, or dashboard display for a controlling a vehicle's security system using an application of a vehicle infotainment platform in accordance with the present disclosure.

FIGS. 10A-10B also shows a smartphone application graphical user interfaces 600A, 600B, 600C, and 600D in accordance with the present disclosure which may show geofence and car location alert features. As show in the user interfaces 600A, 600B, 600C, and 600D, the smartphone application can track the location of each vehicle associated with the household and alert the driver as to the status of the locking mechanisms of the vehicle. In FIG. 10A, the interface 600A shows the software application has been paired with a GTI car. The other user interfaces 600B, 600C, and 600D show the car, the GTI, linked to the application in a disarmed state, an armed state, and a moving state, respectively. Various details and descriptions of the application are also shown in each interface screen.

Driving may be social and as such being part of a multi-user integrate platform has advantages. Sometimes users drive with friends and family, sometimes they drive alone. In general, users always want to be connected with both. A vehicle information platform's Drive application allows users to log their trips, including where and when they drove, how fast, how many stops, and fuel & cost data may be captured. With that data, efficiency may be compared and data may be shared over social networks. For example, referring now to FIGS. 8A-8D, a smartphone application graphical user interface 400A, 400B, 400C and 400D in accordance with the present disclosure is shown, and may be used to enable related Drive application features. A driver score, maps, trips, activity, badges, gas consumption and other information can be relayed using the Drive application.

Home and other intelligent devices are becoming internet-connected at a fast rate. Personal clouds contain rich amounts of data from these devices filling our lives. A home application of the vehicle information platform may be designed to integrate a connected car into IoT ecosystems. From a vehicle information application smartphone application, rules or triggers may be defines that relate to a car and alerts may be provided in the car.

For example, when a car nears home, the vehicle information platform may turn on the network or wireless controlled lights, raise the Nest controlled temperature, disarm the security as the car enters the garage, pre-heat the oven for cooking or otherwise interact with an IoT or other remotely controllable device using the vehicle platforms and systems described herein. Integration of the time you spent in the car with the rest of and individual's digital life may be facilitated by the Home application. For example, referring now to FIGS. 9A-9D, a smartphone application graphical user interface in accordance with the present disclosure is shown, and may be used to enable related Home application features. Examples of the Home application are also discussed above.

As show in the user interfaces 500A, 500B, 500C, and 500D, the smartphone application can connect with a user's home and implement various functions such as temperature settings, sprinkler settings, light settings and others. In FIG. 9B, the interface 600B shows the software application has been designed to specify rules. The other user interfaces 500C and 500D show the newest rule and the settings for the rule, respectively. In this way, a user can specify rules for the operation of the home such as when vehicle V1 is within 1 mile of the house turn on the lights and adjust the bedroom temperature to a set value.

Thus, the broad IoT connected device world may be harnessed for the driver via the OIP described herein, related cloud services, mobile device integration and application developers. In an implementation, a developer kit may be provided to allow developers to more easily and efficiently develop applications for the vehicle infotainment system and/or protocol. The developer kit may include a simulator (e.g., that works with a client electronic device or is a standalone device) so that the developer does not have to actually use a vehicle for development purposes.

In an implementation the vehicle infotainment system and platform may be open to developers. The vehicle infotainment platform may include an open-web platform for developers, which may be secure, flexible, and robust. Developers may use web, desktop, and mobile SDKs provided by the service provider administering the vehicle infotainment platform. Developers may have previously only been able to create applications for certain makes and models of cars. Using the techniques and features described here, developers may create applications that work on some or on almost all cars and models using the application programming interface (API) described herein. Further details regarding the API may be found in Appendix A.

Further, developers may start with hardware devices (e.g., base unit and backpack) and may extend the capabilities of the vehicle infotainment platform by creating additional backpacks that may connect physically to the original backpack or base unit or wirelessly.

Developer tools may include SDK's for iOS, Android and Window, sample code, documentation, and/or developer kits. Applications may be created and managed at a granular level.

In one embodiment, a vehicle platform for software applications such as CarPort provides developers with the opportunity to place a view of their applications inside a vehicle, whether on a phone or console or other vehicle display. From within the CarPort application, users can switch between applications, see application-specific information overlaid on top of a map showing each of the user's devices. In one embodiment, as part of the setup, applications provide a single URL for the CarPort application to fetch current state information. In addition, applications can push events and other status information to the CarPort application in near real-time. Once an application is created in the Developer Portal, it can be enabled in the CarPort application.

When carport is first opened by a user on a particular vehicle, a certain amount of state data must be sent to the carport display in order to have the current state of an application loaded immediately. When configuring an application to be Carport-enabled, a developer will have to provide a feedUrl property that defines the format by which Carport will fetch this information.

In addition, in one embodiment, CarPort allows an application to send real time events to a user's CarPort display. There are four types of information that can be sent to CarPort in some embodiments. These include:

Feed Item—represents an event in a timeline and appear in the left column in reverse chronological order. Each feed item has text, subtext, and a primary and optional secondary icon.

Alert—appears momentarily and can be optionally dismissed by the user or automatically dismissed after a short period of time. Alerts only display a single messages string.

Device Status—shows the current status of a given device. Status is defined within the context of the application and includes a color (chosen from the primary, secondary, or tertiary colors in the CarPort config) and a simple label. An example would be showing a device as "At Home" or "Active". In addition, the color selected is displayed as a ring around the device's marker on the map.

Map Feature—represents a geospatial feature specific to a single application. Each map feature is displayed on the map alongside the devices. Optionally, a feed item can reference a map feature such that it will be highlighted when that feed item is tapped.

Developers can use an API request will add a feed item with text, subtext, and a primary and (optional) secondary icon. Additional exemplary API details are shown in Appendix A. Developers can use an API request to display an alert to the carport landing page. The alert is either auto dismissed after a short amount of time or dismissed by the user. Developers can use an API request to update device status such as to update the color and label of a device as displayed in carport. Developers can use an API request to draw a mapFeature (i.e. a geofence ring) at the designated location with the specified radius and color. Developers can use an API request to update a mapFeature (i.e. a geofence ring) at the designated location with the specified radius and color; must provide the mapFeatureId to be updated. Developers can use an API request to delete a mapFeature from the map.

Various developer tools, methods, and processes which may be used in connection with one or more application programming interfaces as described herein in connection with the vehicle infotainment platform may be shown in Appendix A.

As described herein, one or more rules services or rules engines can be implemented using one or more computing devices, communication channels, control systems, and vehicle communication protocols. One or more rules engines or other computing devices of the vehicle platform can be used to implement a rules service to process and implement rules for various applications on the platform. In one embodiment, rules and associated rules processing can trigger events, subscriptions, and other activates based upon vehicle parameters and geofences (or other location based boundaries and information). In one embodiment, rules are processed to evaluate a vehicle's location and vehicle parameters such as its operating parameters. When the vehicle satisfies all of the boundary conditions for a rule, an event service or schedules notifies subscribed applications on the platform. Thus, if car V1 leaves the house and there is a rule that is trigger based on that occurrence, applications on the platform that use that rule are notified.

In one embodiment, a rule is implemented such that it contains one or more of the following a device identifier; a collection of boundaries for the device; and a state. In one embodiment, the state is implemented in the rule such that it is always one of: (a) "unevaluated" meaning not enough geospatial data is available; (b) "uncovered" meaning at least one of the boundaries conditions is unsatisfied; and (c) "covered" meaning that all of the boundary conditions are satisfied. The device can be a vehicle or a device connected to a vehicle or another computing device as described herein.

In one embodiment, a rule is "covered" when all boundary conditions are true. In one embodiment a rule is "uncovered" when at least one boundary condition is false. Further, when there is insufficient data to determine whether a rule is "covered" or "uncovered" the rule's state is "unevaluated". When sufficient geospatial data is available to change state, the rule service may do one of the following: changes the state of the rule to "covered" or "uncovered", and creates either a "rule-entry" or "rule-leave" event for applications.

For example, suppose an application establishes a boundary condition around the home of a vehicle owner. When the owner drives home from work, the rule service detects that a geospatial Boundary condition is satisfied. The various dotted circles shown in the user interface screens are examples of boundaries. Interaction with such boundaries can trigger various rules. The service sets the rule state to "covered" and then sends a "rule-entry" event to the app. Likewise, when the vehicle owner leaves home for work, the rule service detects that a geospatial Boundary condition is no longer met. The service sets the rule state to "uncovered" and then sends a "rule-leave" event to the app. Applications can subscribe to these events in three ways which are as follows: to the "rule-entry" only, to the "rule-leave" only, and or to both with "rule-*".

In one embodiment, for a given rule being handled by the rules service/rules engine, a boundary is either: a geospatial boundary that defines a region on the Earth's surface, or a parametric boundary that defines a range for some vehicle parameter. A geospatial boundary defines a circular geographic region by specifying: a single geographic point, and a radius in meters or other units. In one embodiment, a parametric boundary specifies either: a bounded range, such as "RPM between 2000 and 4000", or • an unbounded range, such as "RPM greater than 3500." A rule is "covered" when all boundary conditions are true. This fact has useful implications for rule design.

As an example, suppose an application developer adds two disjoint geospatial boundaries to a rule. The rule can never enter the "covered" state nor ever fire a "rule-entry" or "rule-leave" event. It will forever remain in the "unevaluated" state. Because the Device can only be in one location at a time, at best it can only satisfy one of the boundary conditions but never both. Similarly, a rule will never fire an event if the rule contains two disjoint parametric boundaries for the same vehicle parameter. For example, "RPM greater than 3500" and "RPM less than 2000" will forever remain in the "unevaluated" state.

In one embodiment, because of these implications, the rule service allows at most one geospatial boundary in a rule. This eliminates the problem of disjoint geospatial regions. However, application developers on the vehicle platforms must still avoid creating disjoint parametric boundaries. In one embodiment, the rule service and the computing device which implement it through software and rules engines, in one embodiment, allows your application to manage the rules for devices.

In some embodiments, rules are immutable. That is, once created, a rule cannot be modified. To change a rule, an application must delete an existing rule, and then create another one. Immutability ensures that a rule is always in a perfectly consistent state. In one embodiment, the rules service/rules engine(s) includes an API that performs one or more of the following: list all of the rules for a device, get a specific rule, create a rule for a device, and delete a rule.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application or in a similar manner and may provide various functionality of the systems and methods as SaaS.

The examples presented herein are intended to illustrate potential and specific implementations of the present invention. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computing device," "computer device," or "processor" may be, for example and without limitation, a processor, microcomputer, minicomputer, server, mainframe, laptop, a dongle, a vehicle information transceiver, personal data assistant (PDA), a vehicle communication system, a vehicle diagnostic system, one or more vehicle sensors, wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "portal" "filter," "service, ""platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various data structures, APIs (application programming interfaces), data types, and other computing architectures can be used. In one embodiment, JavaScript Object Notation (JSON) is used as data exchange/data transmission format.

Other data exchange/data transmission formats can be used between the various devices, platforms, portals, and APIs described and depicted herein without limitation.

Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including Web Sphere Application Server. Other examples include Web Sphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an WL, JSON, plain text, or other types of files. Moreover, where a table or hash table is mentioned, other data structures (such as spreadsheets, relational databases, or structured files) may be used.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention. Accordingly, other embodiments and implementations are within the scope of the following claims. For example, the actions recited in the claims can be performed in a different order and still achieve desirable results.

What is claimed is:

1. A method of controlling vehicle information exchange between one or more computing devices comprising:
    collecting and normalizing data from a plurality of data sources through a cloud-based vehicle information platform, the one or more data sources comprising a telematics control unit, a mobile device, a third-party computing device, a dash camera, and other cloud-based services; and
    providing an application programming interface corresponding to the vehicle information platform wherein one or more applications use the collected and normalized data and access one or more services on the vehicle information platform, the one or more services including device services, event services, telemetry services, vehicle services, safety services, transaction services, trip services, behavioral services, and diagnostic services,
    wherein the collected and normalized data is accessed over the application programming interface without regard for which of the plurality of data sources the data originated,
    wherein the vehicle information platform requires an authentication information prior to initially granting secure access to user data, wherein the authentication information is selected from a group consisting of a password, a phrase, a biometric identifier, and multifactor authentication information, and
    wherein the one or more services are provided through the vehicle information platform to be accessed and displayed on a computing device disposed within a vehicle via the vehicle infotainment platform and the computing device is responsive to the one or more services provided by the vehicle information platform.

2. The method of claim 1 wherein the computing device disposed within the vehicle is an automotive infotainment head unit.

3. The method of claim 2 wherein the automotive infotainment head unit comprises a display, one or more processors, and one or more buses, wherein the buses are in electronic communication with the one or more processors processor and in-vehicle infotainment (IVI) memory of the vehicle.

4. The method of claim 1 wherein the computing device disposed within the vehicle comprises a mobile electronic device.

5. The method of claim 2 wherein the application programming interface (API) is responsive to API requests from an active vehicle information platform application displayed on the automotive infotainment head unit.

6. The method of claim 5 wherein the API is responsive to instructions transmitted from one or more third party computing devices to provide one or more types of content to the automotive infotainment head unit.

7. The method of claim 2 further comprising filtering developer provided configuration information for each application such that information displayed to automotive infotainment head unit is constrained to reduce end user distraction.

8. The method of claim 1 further comprising providing a rules service as part of the vehicle information platform, wherein one or more rules are subscribed to by the one or more applications, wherein one or more of the rules comprise a device identifier; one or more boundary constraints for the device, and a state.

9. The method of claim 1 further comprising controlling which of the one or more services is displayed and how they are displayed in response to one or more rules, wherein the rules are based on at least one of a vehicle situation, a location, a time, and a user setting.

10. The method of claim 1 further comprising, in response to vehicle telemetry data, displaying a first category of information to a user from an application when the vehicle is in motion and displaying a second category of information to the user when the vehicle has stopped.

11. The method of claim 1 further comprising accessing one or more of maintenance milestones and predictive diagnostics in response to a triggered vehicle alert, deciphering diagnostic trouble codes (DTC), and presenting related vehicle maintenance information in real-time based on accessed information.

12. The method of claim 1 wherein a data collection software application configured to communicate with the vehicle infotainment platform is installed in or in communication with a vehicle infotainment memory and further comprising outputting, to a user, information generated in response to data collected from the data collection software application.

13. A system comprising:
- a plurality of data sources comprising a telematics control unit, a mobile device, a third-party computing device, a dash camera, and other cloud-based services;
- a cloud-based vehicle information platform, wherein the vehicle information platform collects and normalizes data from the plurality of data sources, and wherein the vehicle information platform requires an authentication information prior to initially granting secure access to user data, wherein the authentication information is selected from a group consisting of a password, a phrase, a biometric identifier, and multifactor authentication information;
- an application programming interface corresponding to the vehicle information platform, wherein one or more applications use the collected and normalized data and access one or more services on the vehicle information platform, the one or more services including device services, event services, telemetry services, vehicle services, safety services, transaction services, trip services, behavioral services, and diagnostic services, wherein the collected and normalized data is accessed over the application programming interface without regard for which of the plurality of data sources the data originated; and
- a computing device disposed within a vehicle that is configured for the one or more services provided through the vehicle information platform to be accessed and displayed via a cloud-integrated vehicle infotainment platform, wherein the computing device is responsive to the one or more services provided by the vehicle information platform.

14. The system of claim 13, wherein the cloud-based vehicle information platform allows access to Internet of Things devices.

15. The system of claim 13, wherein the cloud-based vehicle information platform provides access to one or more of driving patterns, vehicle health, trip specific scenarios, connections, people, and external devices.

16. The system of claim 13, wherein the cloud-based vehicle information platform allows access to intelligent home devices including one or more of smart vents, smart thermostats, smart security, smart lighting systems, distributed audio, smart pet devices, and awareness of these devices.

17. The system of claim 13, wherein the cloud-based vehicle information platform is configured to control one or more intelligent home devices including at least one of smart vents, smart thermostats, smart security, smart lighting systems, distributed audio, smart pet devices, and awareness of these devices.

18. The system of claim 13, wherein the cloud-based vehicle information platform displays one or more vehicle information platform application-based user interfaces via the computing device, which is an automotive infotainment head unit.

* * * * *